(12) United States Patent
Chen et al.

(10) Patent No.: US 12,256,265 B2
(45) Date of Patent: Mar. 18, 2025

(54) DATA TRANSMISSION METHOD AND APPARATUS, AND STORAGE MEDIUM

(71) Applicant: XI'AN ZHONGXING NEW SOFTWARE CO., LTD., Shaanxi (CN)

(72) Inventors: Xianming Chen, Guangdong (CN); Bo Dai, Guangdong (CN); Kun Liu, Guangdong (CN); Weiwei Yang, Guangdong (CN); Huiying Fang, Guangdong (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 452 days.

(21) Appl. No.: 17/712,226

(22) Filed: Apr. 4, 2022

(65) Prior Publication Data

US 2022/0231793 A1     Jul. 21, 2022

Related U.S. Application Data

(62) Division of application No. 16/650,891, filed as application No. PCT/CN2018/108564 on Sep. 29, 2018, now Pat. No. 11,336,404.

(30) Foreign Application Priority Data

Sep. 29, 2017    (CN) .......................... 201710907983.0

(51) Int. Cl.
*H04L 1/1829*     (2023.01)
*H04L 1/1867*     (2023.01)
(Continued)

(52) U.S. Cl.
CPC .......... *H04W 28/04* (2013.01); *H04L 1/1864* (2013.01); *H04L 1/189* (2013.01); *H04L 5/0055* (2013.01);
(Continued)

(58) Field of Classification Search
CPC ........... H04L 1/12–1896; H04L 5/0001–0098; H04W 28/02–26; H04W 72/02–569;
(Continued)

(56) References Cited

U.S. PATENT DOCUMENTS

| | | |
|---|---|---|
| 2013/0039193 A1 | 2/2013 | Yin et al. |
| 2017/0027002 A1 | 1/2017 | Yerramalli et al. |

(Continued)

FOREIGN PATENT DOCUMENTS

| | | |
|---|---|---|
| CN | 107078863 A | 8/2017 |
| EP | 3139682 A1 | 3/2017 |

OTHER PUBLICATIONS

ZTE. "Detailed Design on UL HARQ-ACK Feedback Enhancement for MTC" 3GPP TSG RAN WGl Meeting #89, R1-1707091, May 15, 2017 (May 15, 2017), sections 2-4.

(Continued)

*Primary Examiner* — Timothy J Weidner
(74) *Attorney, Agent, or Firm* — McDonald Hopkins LLC

(57) ABSTRACT

Provided are a data transmission method and apparatus, and a storage medium. The method includes: receiving second downlink control information over a second search space, and rejecting receiving first downlink control information over a first search space; wherein the second downlink control information comprises downlink control information for carrying feedback of a base station.

12 Claims, 5 Drawing Sheets

---

Receive second downlink control information over a second search space, and reject receiving first downlink control information over a first search space; where the second downlink control information includes downlink control information for carrying feedback from a base station         S502

(51) Int. Cl.
*H04L 5/00* (2006.01)
*H04W 28/02* (2009.01)
*H04W 28/04* (2009.01)
*H04W 72/1263* (2023.01)
*H04W 72/23* (2023.01)
*H04W 76/27* (2018.01)
*H04W 76/28* (2018.01)
*H04W 76/30* (2018.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ....... *H04L 5/0076* (2013.01); *H04W 28/0289* (2013.01); *H04W 72/1263* (2013.01); *H04W 72/23* (2023.01); *H04W 76/27* (2018.02); *H04W 76/28* (2018.02); *H04W 76/30* (2018.02); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC .......... H04W 74/002–0891; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

| | | | |
|---|---|---|---|
| 2020/0022175 A1 | 1/2020 | Xiong et al. | |
| 2020/0052835 A1 | 2/2020 | Xiong et al. | |
| 2020/0092044 A1 | 3/2020 | Park et al. | |
| 2020/0092858 A1* | 3/2020 | Ye | H04W 72/23 |
| 2020/0178284 A1* | 6/2020 | Chen | H04W 72/23 |

OTHER PUBLICATIONS

ZTE. "Evaluation and UL HARQ-ACK Feedback Enhancement for MTC" 3GPP TSG RAN WGl Meeting #90, R1-1713007, Aug. 21, 2017 (Aug. 21, 2017), sections 2-3.

ZTE et al. "Summary of Uplink HARQ-ACK Feedback for MTC" 3GPP TSG RAN WGl Meeting #92bis, R1-1805311, Apr. 16, 2018 (Feb. 16, 2018), section 2.

ZTE et al. "Further Consideration on Uplink HARQ-ACK Feedback in EFeMTC" 3GPP TSG-RAN WG2 Meeting #101, R2-18022162, Feb. 26, 2018 (Feb. 26, 2018), section 2.

English Translation of International Search Report mailed Jan. 3, 2019; International Patent Application No. PCT/CN2018/108564 filed on Sep. 29, 2018.

* cited by examiner

DATA TRANSMISSION METHOD AND APPARATUS, AND STORAGE MEDIUM

CROSS-REFERENCE TO RELATED APPLICATIONS

This application is a divisional application of U.S. application Ser. No. 16/650,891 filed on Mar. 26, 2020, which is a 35 U.S.C. 371 national stage filing of PCT Application No. PCT/CN2018/108564 filed on Sep. 29, 2018, which claims priority to Chinese Patent Application No. 201710907983.0, filed on Sep. 29, 2017, the disclosures of each of which are hereby incorporated by reference in their entireties.

TECHNICAL FIELD

The present application relates to the field of communications and, for example, to a data transmission method and apparatus, and a storage medium.

BACKGROUND

The existing Machine type Communication (MTC) system supports repeat transmission. During transmission of a message 3 or a Physical Uplink Shared Channel (PUSCH), a base station does not send any feedback corresponding to the message 3 or PUSCH, and accordingly, a terminal does not receive feedback corresponding to the message 3 or PUSCH. The message 3 is a message sent by the terminal to the base station during the random access. In this case, even if the base station decodes the message 3 or PUSCH data early, the terminal cannot terminate the transmission of the message 3 or PUSCH early, and eventually, this causes unnecessary loss of uplink resources and terminal transmission power.

SUMMARY

The summary of the subject described in the disclosure in detail will be described below. The summary is not intended to limit the scope of the claims.

Embodiments of the present disclosure provide a data transmission method and apparatus so as to avoid waste of resources and sending power of the terminal caused by the PUSCH transmission in the related art.

According to an embodiment of the present disclosure, a data transmission method is provided. The method includes: receiving downlink data during a PUSCH transmission; in response to the received downlink data being first feedback, terminating the PUSCH transmission; and in response to the received downlink data being second feedback, terminating the PUSCH transmission and executing a first operation.

According to an embodiment of the present disclosure, another data transmission method is provided. The method includes: during a random access process, a terminal receiving downlink data sent by a base station during a period of sending uplink data; and terminating transmission of the uplink data after the downlink data is received.

According to an embodiment of the present disclosure, yet another data transmission method is provided. The method includes: receiving second downlink control information over a second search space, and rejecting receiving first downlink control information over a first search space; where the second downlink control information includes downlink control information for carrying feedback of a base station.

According to another embodiment of the present disclosure, a data transmission apparatus is provided. The apparatus includes: a receiving module, which is configured to receive downlink data during a PUSCH transmission; and a terminating module, which is configured to, in response to the received downlink data being first feedback, terminate the PUSCH transmission, and in response to the received downlink data being second feedback, terminate the PUSCH transmission and execute a first operation.

According to another embodiment of the present disclosure, another data transmission apparatus is provided. The apparatus includes: a receiving module, which is configured to, during a random access process, receive, by a terminal, downlink data sent by a base station when the terminal sends uplink data; and a terminating module, which is configured to terminate transmission of the uplink data after the downlink data is received.

According to another embodiment of the present disclosure, yet another data transmission apparatus is provided. The apparatus includes: a processing module, which is configured to receive second downlink control information over a second search space, and reject receiving first downlink control information over a first search space; where the second downlink control information includes downlink control information for carrying feedback of a base station.

According to yet another embodiment of the present disclosure, a storage medium is further provided. The storage medium includes stored programs which, when executed, perform the data transmission method of any of the method embodiments of the present disclosure.

According to yet another embodiment of the present disclosure, a processor is further provided. The processor is configured to execute programs which, when executed, perform the data transmission method of any of the method embodiments of the present disclosure.

Other aspects of the present invention will be understood upon reading and understanding drawings and following detailed description.

BRIEF DESCRIPTION OF THE DRAWINGS

The drawings described herein are used to provide a further understanding of the present disclosure, and form a part of the present disclosure. The exemplary embodiments and descriptions thereof in the present disclosure are used to explain the present disclosure are not intended to limit the present disclosure. In the drawings.

DETAILED DESCRIPTION

The present invention will be described hereinafter in detail with reference to the drawings and in conjunction with embodiments. It is to be noted that if not in collision, the embodiments and features therein in the present disclosure can be combined with each other.

It is to be noted that the terms "first", "second" and the like in the description, claims and drawings of the present disclosure are used to distinguish between similar objects and are not necessarily used to describe a particular order or sequence.

Embodiment One

The network architecture of this embodiment of the present disclosure includes: a base station and a terminal, and information interaction is carried out between the base station and the terminal.

Figure 1:
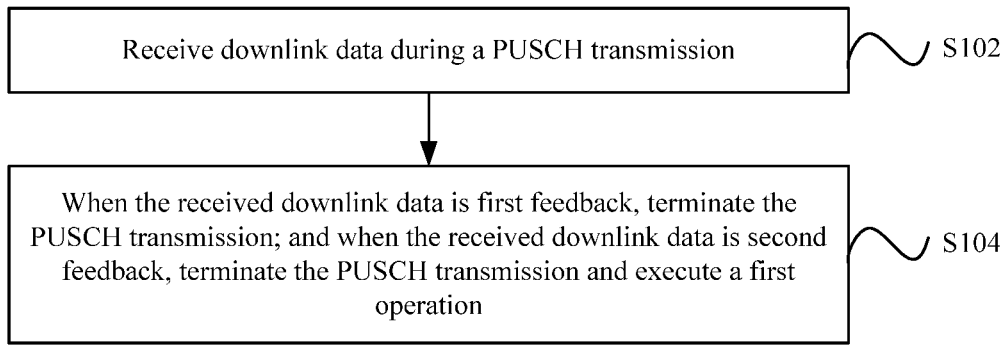
FIG. 1 is a flowchart one of a data transmission method according to an embodiment of the present disclosure.

This embodiment provides a data transmission method. FIG. 1 is a flowchart one of a data transmission method according to this embodiment of the present disclosure. As shown in FIG. 1, the method includes steps S102 and S104.

In step S102, downlink data is received during a PUSCH transmission.

In step S104, when the received downlink data is first feedback, the PUSCH transmission is terminated; and when the received downlink data is second feedback, the PUSCH transmission is terminated and a first operation is executed.

Through the above steps, when the base station decodes PUSCH data earlier, a terminal can terminate PUSCH transmission earlier, which avoids unnecessary loss of uplink resources and the sending power of the terminal and avoids the waste of resources and the sending power of the terminal caused by PUSCH transmission in the related art.

In one embodiment, the above steps may be executed by, but is not limited to, the terminal.

In one embodiment, the first operation includes: entering a discontinuous reception_OFF (DRX_OFF) state or releasing a radio resource control (RRC) connection.

In one embodiment, the method further includes: during the PUSCH transmission, when the received downlink data is third feedback, the PUSCH transmission is terminated and a second operation is executed.

In one embodiment, when the first operation is entering the DRX_OFF state, the second operation is releasing the RRC connection; and when the first operation is releasing the RRC connection, the second operation is entering the DRX_OFF state.

In one embodiment, the method further includes steps S11 and S12.

In step S11, outside PUSCH transmission time, the downlink data is received.

In step S12, when the received downlink data is the second feedback, the first operation is executed.

In one embodiment, the method further includes steps S21 and S22.

In step S21, outside PUSCH transmission time, the downlink data is received.

In step S22, when the received downlink data is the third feedback, the second operation is executed.

In one embodiment, releasing the RRC connection includes: entering an idle state after feedback for acknowledging RRC connection release is sent to the base station.

It is to be noted that in this embodiment, entering the DRX_OFF state refers to that a terminal in a connected state enters a sleep state or a light sleep state, and in this case, the terminal no longer monitors a search space.

It is to be noted that in this embodiment, one PUSCH transmission may be divided into multiple segments and adjacent PUSCH segments have a fixed gap. In this case, the gap between adjacent PUSCH segments is also considered as the period of PUSCH transmission.

Figure 2:
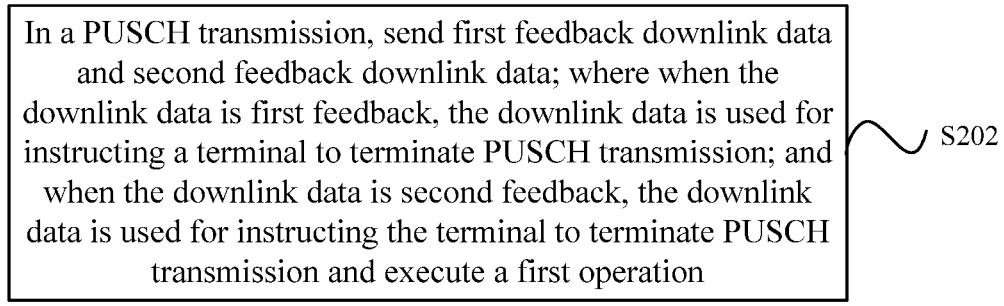
FIG. 2 is a flowchart two of a data transmission method according to an embodiment of the present disclosure.

This embodiment provides another data transmission method. FIG. 2 is a flowchart two of a data transmission method according to this embodiment of the present disclosure. As shown in FIG. 2, the method includes step S202.

In step S202, in the period of PUSCH transmission, downlink data is sent; where when the downlink data is first feedback, the downlink data is used for instructing a terminal to terminate PUSCH transmission; and when the downlink data is second feedback, the downlink data is used for instructing the terminal to terminate PUSCH transmission and execute a first operation.

In one embodiment, the first operation includes: entering a DRX_OFF state or releasing an RRC connection.

In one embodiment, the method further includes: during the PUSCH transmission, when the downlink data is third feedback, the downlink data is used for instructing the terminal to terminate PUSCH transmission and execute a second operation.

This embodiment further includes another scenario, and the method further includes: outside PUSCH transmission time, downlink data is sent; where when the downlink data is second feedback, the downlink data is used for instructing the terminal to execute a first operation.

In one embodiment, the method further includes: outside PUSCH transmission time, downlink data is sent; where when the downlink data is third feedback, the downlink data is used for instructing the terminal to execute a second operation.

In one embodiment, when the first operation is entering the DRX_OFF state, the second operation is releasing the RRC connection; and when the first operation is releasing the RRC connection, the second operation is entering the DRX_OFF state.

In one embodiment, after instructing the terminal to release the RRC connection, the base station receives feedback for acknowledging RRC connection release sent by the terminal.

Figure 3:
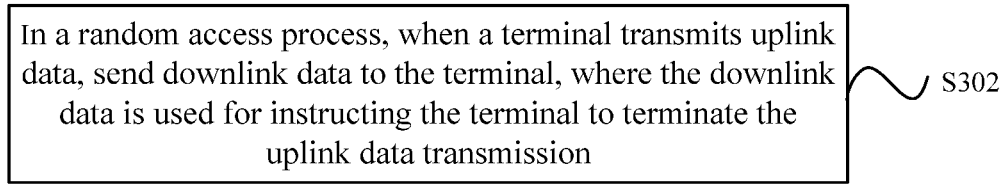
FIG. 3 is a flowchart three of a data transmission method according to an embodiment of the present disclosure.

This embodiment provides yet another data transmission method. FIG. 3 is a flowchart three of a data transmission method according to this embodiment of the present disclosure. As shown in FIG. 3, the method includes step S302.

In step S302, in a random access process, when a terminal is transmitting uplink data, downlink data is sent to the terminal; where the downlink data is used for instructing the terminal to terminate the transmission of the uplink data.

In one embodiment, the downlink data includes at least one of: downlink control information for scheduling a message 4, or downlink control information for scheduling a message 2. When the downlink data is the downlink control information for scheduling the message 4, the uplink data is a message 3; and when the downlink data is the downlink control information for scheduling the message 2, the uplink data is a message 1.

In one embodiment, before the downlink data is sent to the terminal, a capability of the terminal to receive the downlink data during the transmission of the uplink data is determined in one of following manners: determining via a field in the uplink data; determining via a field of an RRC message; or determining via a sequence used by the uplink data.

Figure 4:
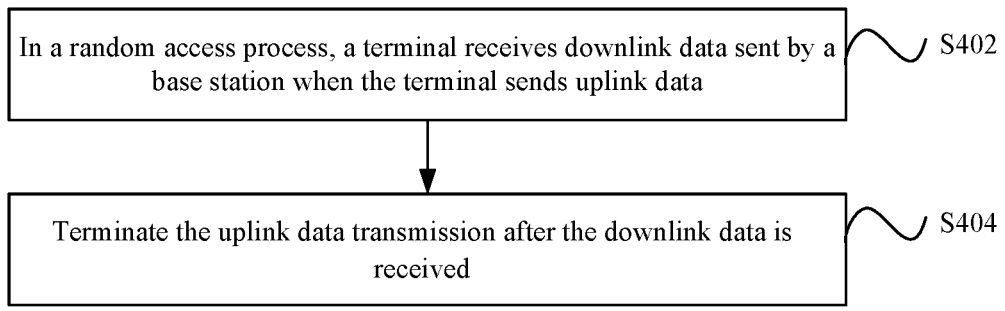
FIG. 4 is a flowchart four of a data transmission method according to an embodiment of the present disclosure.

This embodiment provides yet another data transmission method. FIG. 4 is a flowchart four of a data transmission method according to this embodiment of the present disclosure. As shown in FIG. 4, the method includes steps S402 and S404.

In step S402, during a random access process, a terminal, when sending uplink data, receives downlink data sent by a base station.

In step S404, transmission of the uplink data is terminated after the downlink data is received.

In one embodiment, the downlink data includes at least one of: downlink control information for scheduling a message 4, or downlink control information for scheduling a message 2. The downlink data is the downlink control information for scheduling the message 4, the uplink data is a message 3; and when the downlink data is the downlink control information for scheduling the message 2, the uplink data is a message 1.

In one embodiment, before the downlink data sent by the base station is received, a capability of the terminal to receive the downlink data during the transmission of the uplink data is reported to the base station in one of following manners: reporting to the base station via a field in the uplink data; reporting to the base station via a field of an RRC message; or reporting to the base station via a sequence used by the uplink data.

Figure 5:
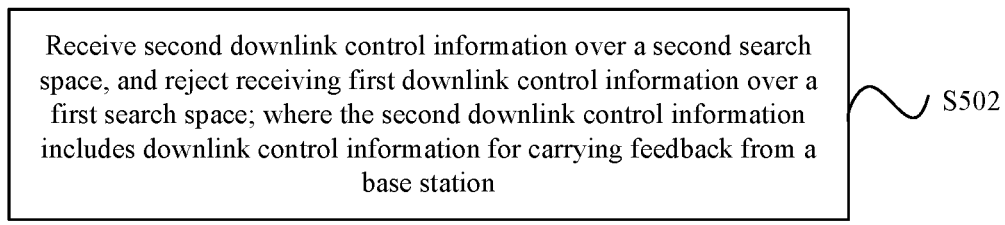
FIG. 5 is a flowchart five of a data transmission method according to an embodiment of the present disclosure.

This embodiment provides yet another data transmission method. FIG. 5 is a flowchart five of a data transmission method according to this embodiment of the present disclosure. As shown in FIG. 5, the method includes step S502.

In step S502, second downlink control information is received over a second search space, and reception of first downlink control information over a first search space is rejected; where the second downlink control information includes downlink control information for carrying feedback of a base station.

In one embodiment, the step that the second downlink control information is received over the second search space and the reception of the first downlink control information over the first search space is rejected includes: during a period of PUSCH transmission, receiving the second downlink control information over the second search space and rejecting receiving the first downlink control information over the first search space.

In one embodiment, from start of PUSCH transmission to end of PUSCH transmission, if the number Y of monitored second search spaces is greater than the number X of the first search spaces, the reception of the first downlink control information over (Y−X) consecutive first search spaces after the end of PUSCH transmission is rejected; where Y and X are both positive integers.

In one embodiment, the step that the second downlink control information is received over the second search space and the reception of the first downlink control information is rejected over the first search space includes: within a maximum PUSCH transmission time range, the second downlink control information is received over the second search space and the reception of the first downlink control information is rejected over the first search space; where the maximum PUSCH transmission time is pre-configured.

In one embodiment, if the number Y of the second search spaces within the maximum PUSCH transmission time range is greater than the number X of the first search spaces, the first downlink control information is rejected to be received over (Y−X) consecutive first search spaces after the maximum PUSCH transmission time; where the Y and X are positive integers.

In one embodiment, if the total number Y of candidate sets in all second search spaces within the maximum PUSCH transmission time range is greater than the total number X of candidate sets in all first search spaces, when the first downlink control information is received over W consecutive first search spaces after the maximum PUSCH transmission time, the first downlink control information is detected only on P candidate sets in each of the W first search spaces; where the number P of candidate sets in one of the second search spaces is less than the number Q of candidate sets in one of the first search spaces, and the Y, X, W and Q are positive integers.

In one embodiment, the feedback (information) in the downlink control information fed back by the base station includes acknowledgement (ACK) feedback corresponding to the PUSCH.

Figure 6:
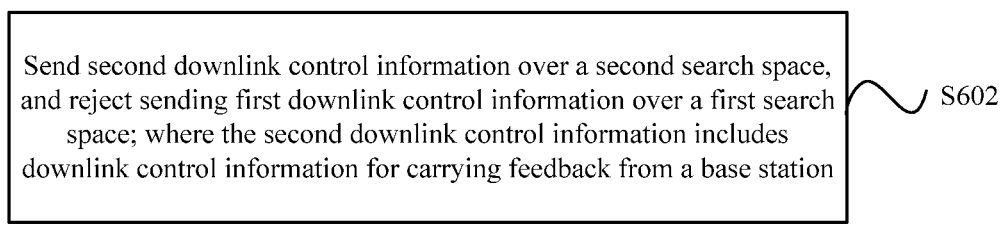
FIG. 6 is a flowchart six of a data transmission method according to an embodiment of the present disclosure.

This embodiment provides yet another data transmission method. FIG. 6 is a flowchart six of a data transmission method according to this embodiment of the present disclosure. As shown in FIG. 6, the method includes step S602.

In step S602, second downlink control information is sent over a second search space, and sending first downlink control information over a first search space is rejected; where the second downlink control information includes downlink control information for carrying feedback of a base station.

In one embodiment, the step that the second downlink control information is sent over the second search space and sending the first downlink control information over the first search space is rejected includes: during a PUSCH transmission, sending the second downlink control information over the second search space and rejecting sending the first downlink control information over the first search space.

In one embodiment, if the number Y of the second search spaces monitored by the terminal from start of PUSCH transmission to end of PUSCH transmission is greater than the number X of the first search spaces, sending of the first downlink control information over (Y−X) consecutive first search spaces after the end of PUSCH transmission is rejected; where the Y and X are both positive integers.

In one embodiment, the step that the second downlink control information is sent over the second search space and sending of the first downlink control information over the first search space is rejected includes: within a maximum PUSCH transmission time range, the second downlink control information is sent over the second search space and sending of the first downlink control information over the first search space is rejected; where the maximum PUSCH transmission time is pre-configured.

In one embodiment, if the number Y of the second search spaces within the maximum PUSCH transmission time range is greater than the number X of the first search spaces, sending the first downlink control information over (Y−X) consecutive first search spaces after the maximum PUSCH transmission time is rejected; where the Y and X are both positive integers.

In one embodiment, if the total number Y of candidate sets in all second search spaces within the maximum PUSCH transmission time range is greater than the total number X of candidate sets in all first search spaces, when the first downlink control information is sent over W consecutive first search spaces after the maximum PUSCH transmission time, the first downlink control information is sent only on P candidate sets in each of the W first search spaces; where the number P of candidate sets in one of the second search spaces is less than the number Q of candidate sets in one of the first search spaces, and the Y, X, W and Q are positive integers.

From the description of the preceding embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the technical solution of the present invention substantially, or the part contributing to the related art, may be embodied in the form of a software product. The computer software product is stored in a storage medium (such as a random access memory (RAM)/read-only memory (ROM), a magnetic disk or an optical disk) and includes several instructions for enabling a terminal device (which may be a mobile phone, a computer, a server, a network device or the like) to execute the method according to each embodiment of the present invention.

Embodiment Two

This embodiment further provides a data transmission apparatus. The apparatus is configured to implement the above embodiments and exemplary embodiments. What has been described will not be repeated. As used below, the term "module" may be software, hardware or a combination thereof capable of implementing predetermined functions. The apparatus described in the following embodiment is preferably implemented by software, but implementation by hardware or a combination of software and hardware is also possible and conceived.

This embodiment provides a data transmission apparatus. The apparatus includes: a receiving module, which is configured to receive downlink data during a PUSCH transmission; and a terminating module, which is configured to, when the received downlink data is first feedback, terminate the PUSCH transmission, and when the received downlink data is second feedback, terminate the PUSCH transmission and execute a first operation.

This embodiment provides another data transmission apparatus. The apparatus includes a sending module, which is configured to send downlink data in a PUSCH transmission; where when the downlink data is first feedback, the downlink data is used for instructing a terminal to terminate the PUSCH transmission; and when the downlink data is second feedback, the downlink data is used for instructing the terminal to terminate PUSCH transmission and execute a first operation.

This embodiment provides yet another data transmission apparatus. The apparatus includes a sending module, which is configured to, in a random access process, send downlink data to a terminal when the terminal is transmitting uplink data; where the downlink data is used for instructing the terminal to terminate the transmission of the uplink data.

This embodiment provides yet another data transmission apparatus. The apparatus includes a receiving module, which is configured to, in a random access process, receive, by a terminal, downlink data sent by a base station when the terminal sends uplink data; and a terminating module, which is configured to terminate transmission of the uplink data after the downlink data is received.

This embodiment provides yet another data transmission apparatus. The apparatus includes a processing module, which is configured to receive second downlink control information over a second search space, and reject receiving first downlink control information over a first search space; where the second downlink control information includes downlink control information for carrying feedback of a base station.

This embodiment provides yet another data transmission apparatus. The apparatus includes a processing module, which is configured to send second downlink control information over a second search space, and reject sending first downlink control information over a first search space; where the second downlink control information includes downlink control information for carrying feedback of a base station.

It is to be noted that the various modules described above may be implemented by software or hardware. Implementation by hardware may, but may not necessarily, be performed in the following manners: the various modules described above are located in the same processor, or the various modules described above are located in different processors in any combination form.

Embodiment Three

This embodiment is an exemplary embodiment of the present disclosure for explaining and describing the present disclosure in detail in conjunction with application examples.

This embodiment provides a data transmission method. The method includes the following content.

Solution One

In a PUSCH transmission, a terminal receives first feedback and second feedback. The first feedback is used for terminating the PUSCH transmission, and the second feedback is used for terminating the PUSCH transmission and executing a first operation. The first operation includes: terminating monitoring of a search space (corresponding to entering a DRX_OFF state in other embodiments) or releasing an RRC connection.

At time other than PUSCH transmission time, the terminal receives the second feedback; where the second feedback is used for executing the first operation.

In the PUSCH transmission, the terminal further receives third feedback; where the third feedback is used for terminating the PUSCH transmission and executing the second operation. When the first operation is terminating monitoring of the search space, the second operation is releasing the RRC connection. When the first operation is releasing the RRC connection, the second operation is terminating monitoring of the search space.

At time other than PUSCH transmission time, the terminal further receives the third feedback; where the third feedback is used for executing the second operation.

Through this solution, when a base station decodes PUSCH data in advance, the terminal can terminate PUSCH transmission in advance, thereby avoiding unnecessary loss of uplink resources and terminal sending power; and when the terminal is required to execute terminating of PUSCH transmission and terminating of monitoring the search space at the same time or execute operations of terminating PUSCH transmission and releasing the RRC connection at the same time, the base station only needs to send feedback once to the terminal, thereby reducing feedback overhead.

This solution includes following embodiments.

Embodiment 1-1

In a PUSCH transmission, a base station successfully decodes PUSCH data.

If the base station wants a terminal to terminate monitoring a search space after the end of PUSCH transmission (e.g., entering a DRX_OFF or sleep state), the base station sends downlink control information carrying second feedback to the terminal over a search space, which is used for terminating PUSCH transmission that is being carried out by the terminal currently and terminating the search space monitoring that is carried out by the terminal after the end of PUSCH transmission. If the base station wants the terminal to release an RRC connection after the end of PUSCH transmission (i.e., entering an idle state), the base station sends downlink control information carrying third feedback to the terminal over a search space, which is used for terminating PUSCH transmission that is being carried out by the terminal currently and releasing the RRC connection after the end of PUSCH transmission. If the base station does not want the terminal to terminate the search space monitoring or release an RRC connection after the end of PUSCH transmission, the base station sends downlink control information carrying first feedback to the terminal over a search space, which is only for terminating PUSCH transmission that is being carried out currently. The terminal receives the downlink control information over the search space. If receiving the downlink control information carrying the first feedback, the terminal terminates PUSCH transmission that is being carried out currently. If receiving the downlink control information carrying the second feedback, the terminal terminates PUSCH transmission that is being carried out currently and stops monitoring the search space after the end of PUSCH transmission. If receiving the downlink control information carrying the third feedback, the terminal terminates PUSCH transmission that is being carried out currently and stops releasing the RRC connection after the end of PUSCH transmission.

First Application Example

A base station schedules a terminal to perform PUSCH transmission and indicates that the number of repetitions of PUSCH transmission is 1024. If the terminal is allowed to terminate PUSCH transmission early, the 1024 repetitions may be considered as the maximum number of repetitions of PUSCH transmission or maximum transmission time of PUSCH transmission. A repetition corresponds to at least one subframe.

In the period of PUSCH transmission, the terminal receives downlink control information over at most three search spaces until the terminal receives downlink control information carrying feedback. The above three search spaces start from the start of the 257-th, 513-th and 769-th repetitions respectively. If PUSCH data is successfully decoded, the base station selects one of the above three search spaces to send the downlink control information carrying feedback. For example, if the base station successfully decodes the PUSCH data before the start time of the 257-th repetition, the downlink control information carrying feedback is sent over a first search space; if the base station successfully decodes the PUSCH data after the start time of the 257-th repetition and before the start time of the 513-th repetition, the downlink control information carrying feedback is sent over a second search space; and if the base station successfully decodes the PUSCH data after the start time of the 513-th repetition and before the start time of the 769-th repetition, the downlink control information carrying feedback is sent over a third search space.

In this example, the base station successfully decodes the PUSCH data after the start time of the 257-th repetition and before the start time of the 513-th repetition. If the base station wants the terminal to terminate the monitoring of the search spaces after the end of PUSCH transmission, the base station sends the downlink control information carrying second feedback over the second search space. Accordingly, after receiving the downlink control information carrying second feedback over the second search space, the terminal terminates the ongoing PUSCH transmission before the end of a second or fourth subframe after the end of transmission of the downlink control information and no longer monitors the search space after the end of PUSCH transmission (i.e., entering the DRX_OFF or sleep state). If the base station wants the terminal to release the RRC connection after the end of PUSCH transmission, the base station sends the downlink control information carrying third feedback over the second search space. Accordingly, after receiving the downlink control information carrying third feedback over the second search space, the terminal terminates the ongoing PUSCH transmission before the end of a second or fourth subframe after the end of transmission of the downlink control information and releases the RRC connection after the end of PUSCH transmission (i.e., entering the idle state). If the base station does not want the terminal to terminate the monitoring of the search spaces or release the RRC connection after the end of PUSCH transmission, the base station sends the downlink control information carrying first feedback over the second search space. After receiving the downlink control information carrying first feedback over the second search space, the terminal terminates the ongoing PUSCH transmission before the end of a second or fourth subframe after the end of transmission of the downlink control information but continues to monitor the search spaces after the end of PUSCH transmission (i.e., maintaining an awake state).

Second Disclosure Example

A base station schedules a terminal to perform PUSCH transmission and indicates that the number of repetitions of the PUSCH transmission is 1024. If the terminal is allowed to terminate PUSCH transmission at an early time, the 1024 repetitions may be considered as the maximum number of repetitions of PUSCH transmission or maximum transmission time of the PUSCH transmission. A repetition corresponds to at least one subframe.

In this example, the PUSCH transmission adopting 1024 repetitions is divided into four segments. Each segment includes 256 repetitions, and adjacent two segments are spaced apart by a gap with a fixed length. In the period of PUSCH transmission, the terminal may receive downlink control information over at most three search spaces until the terminal receives downlink control information carrying feedback. A first search space is located in a gap between the first and second segments of PUSCH transmission, a second search space is located in a gap between the second and third segments of PUSCH transmission, and a third search space is located in a gap between the third and fourth segments of PUSCH transmission. If PUSCH data is successfully decoded, the base station selects one of the above three search spaces to send the downlink control information carrying feedback. For example, if the base station successfully decodes the PUSCH data before the start of the second segment of the PUSCH transmission, the downlink control information carrying feedback is sent over the first search space; if the base station successfully decodes the PUSCH data after the end of the second segment of PUSCH transmission and before the start of the third segment of PUSCH transmission, the downlink control information carrying feedback is sent over the second search space; and if the base station successfully decodes the PUSCH data after the end of the third segment of PUSCH transmission and before the start of the fourth segment of PUSCH transmission, the downlink control information carrying feedback is sent over the third search space.

In this example, the base station successfully decodes the PUSCH data after the end of the second segment of PUSCH transmission and before the start of the third segment of PUSCH transmission. If the base station wants the terminal to terminate the monitoring of the search spaces after the end of PUSCH transmission, the base station sends the downlink control information carrying second feedback over the second search space. Accordingly, after receiving the downlink control information carrying second feedback over the second search space, the terminal terminates the ongoing PUSCH transmission and no longer monitors the search spaces after the end of PUSCH transmission (i.e., entering the DRX_OFF or sleep state). If the base station wants the terminal to release the RRC connection after the end of PUSCH transmission, the base station sends the downlink control information carrying third feedback over the second search space. Accordingly, after receiving the downlink control information carrying third feedback over the second search space, the terminal terminates the ongoing PUSCH transmission and releases the RRC connection after the end of PUSCH transmission (i.e., entering the idle state). If the base station does not want the terminal to terminate the monitoring of the search space or release the RRC connection after the end of PUSCH transmission, the base station sends the downlink control information carrying first feedback over the second search space. Accordingly, after receiving the downlink control information bearing first feedback over the second search space, the terminal terminates the ongoing PUSCH transmission but continues to monitor the search spaces after the end of PUSCH transmission (i.e., maintaining an awake state).

Embodiment 1-2

Outside the period of the PUSCH transmission, if the base station wants the terminal to stop monitoring the search space, the base station sends downlink control information carrying second feedback to the terminal over the search space, which is used for stopping the terminal from monitoring the search space. If the base station wants the terminal to release the RRC connection (i.e., entering the idle state), the base station sends downlink control information carrying third feedback to the terminal over the search space, which is used for releasing the RRC connection of the terminal.

The terminal receives the downlink control information over the search space. If the downlink control information carrying the second feedback is received, the terminal terminates the monitoring of the search space; and if the downlink control information carrying the third feedback is received, the terminal releases the RRC connection.

Embodiment 1-3

If the base station wants the terminal to stop monitoring the search space after the end of PUSCH transmission, the base station sends downlink control information carrying second feedback to the terminal over the search space, which is used for terminating PUSCH transmission that is being carried out by the terminal currently and stopping the terminal from monitoring the search space after the end of PUSCH transmission. If the base station does not want the terminal to terminate the search space monitoring after the end of PUSCH transmission, the base station sends downlink control information carrying first feedback to the terminal over the search space, which is only used for terminating PUSCH transmission that is being carried out currently. Accordingly, the terminal receives the control information over the search space. If the downlink control information carrying first feedback is received, the terminal terminates the PUSCH transmission that is being carried out currently; and if the downlink control information carrying second feedback is received, the terminal terminates PUSCH transmission that is being carried out currently and stops monitoring the search space after the end of PUSCH transmission.

Application Example

A base station schedules a terminal to perform PUSCH transmission and indicates that the number of repetitions of PUSCH transmission is 1024. Since the terminal is allowed to terminate PUSCH transmission at an earlier time, the 1024 repetitions may be considered as the maximum number of repetitions of the PUSCH transmission or maximum transmission time of the PUSCH transmission. A repetition corresponds to at least one subframe.

In the period of PUSCH transmission, the terminal receives downlink control information over at most three search spaces until the terminal receives downlink control information carrying feedback; where the above three search spaces start from the start of the 257-th, 513-th and 769-th repetitions respectively. If PUSCH data is successfully decoded, the base station selects one of the above three search spaces to send the downlink control information carrying feedback. For example, if the base station successfully decodes the PUSCH data before the start time of the 257-th repetition, the downlink control information carrying feedback is sent over a first search space; if the base station successfully decodes the PUSCH data after the start time of the 257-th repetition and before the start time of the 513-th repetition, the downlink control information carrying feedback is sent over a second search space; and if the base station successfully decodes the PUSCH data after the start time of the 513-th repetition and before the start time of the 769-th repetition, the downlink control information carrying feedback is sent over a third search space.

In this example, the base station successfully decodes the PUSCH data after the start time of the 257-th repetition and before the start time of the 513-th repetition. If the base station wants the terminal to terminate the monitoring of the search space after the end of PUSCH transmission, the base station sends the downlink control information carrying second feedback over the second search space. Accordingly, after receiving the downlink control information carrying second feedback over the second search space, the terminal terminates the ongoing PUSCH transmission before the end of a second or fourth subframe after the end of transmission of the downlink control information and no longer monitors the search space after the end of PUSCH transmission. If the base station does not want the terminal to terminate the monitoring of the search space after the end of PUSCH transmission, the base station sends the downlink control information carrying first feedback over the second search space. Accordingly, after receiving the downlink control information carrying first feedback over the second search space, the terminal terminates the ongoing PUSCH transmission before the end of a second or fourth subframe after the end of transmission of the downlink control information but continues to monitor the search space after the end of PUSCH transmission (i.e., maintaining an awake state).

Embodiment 1-4

Outside the PUSCH transmission time, if the base station wants the terminal to stop monitoring the search space, the base station sends downlink control information carrying second feedback to the terminal over the search space, which is used for terminating the PUSCH transmission that is being carried out by the terminal currently. The terminal receives the downlink control information over the search space. If the downlink control information carrying the second feedback is received, the terminal terminates the monitoring of the search space.

Embodiment 1-5

The manner of transmitting the feedback includes at least one of the following: indicating the feedback via a field in first terminal-specific downlink control information; indicating the feedback via a field in second terminal-specific downlink control information; or indicating the feedback via a field in common downlink control information.

The first terminal-specific downlink control information and the second terminal-specific downlink control information are different in the downlink control information format. Using an MTC system as an example, the first terminal-specific downlink control information is downlink control information formats 6-0A and 6-0B, and the second terminal-specific downlink control information is control information formats 6-1A and 6-1B. Using a Narrow Band Internet of Things (NB-IoT) system as an example, the first terminal-specific downlink control information is a downlink control information format N0, and the second terminal-specific downlink control information is a control information format N1. In another example, the first terminal-specific downlink control information is a downlink control information format for transmitting uplink scheduling information, and the second terminal-specific downlink control information is a downlink control information format for transmitting downlink scheduling information. In addition, fields in the first terminal-specific downlink control information and the second terminal-specific downlink control information may be fields specific for indicating feedback or existing fields (which indicate feedback using unused state).

When three types of feedback exist, first feedback, second feedback and third feedback are distinguished in one of following manners.

In a manner one, the first feedback is indicated via a field in the common downlink control information; the second feedback is indicated via a field in the first terminal-specific downlink control information; and the third feedback is indicated via a field in the second terminal-specific downlink control information.

For example, using an MTC system with a system bandwidth of 10 MHz and a terminal transmission bandwidth of 1.4 MHz as an example, a specified bit value in the common downlink control information being "1" represents the first feedback; a value of a "resource allocation" field in the downlink control information format 6-0A being "00010101" or "00011111" represents the second feedback (where "00010101" or "00011111" is a state that is not used to indicate the resource allocation), and a value of a "modulation coding scheme" field in the downlink control information format 6-0B being "1011", "1111" or "11xx" represents the second feedback (where "1011", "1111" or "11xx" is a state that is not used to indicate the modulation coding scheme); a value of a "resource allocation" field in the downlink control information format 6-1A being "00010101" or "00011111" represents the third feedback; and a value of a "modulation coding scheme" field in the control information format 6-1B being "1011", "1111" or "11xx" represents the third feedback. Further using an NB-IoT system as an example, a specified bit value in the common downlink control information being "1" represents the first feedback; a value of a "modulation coding scheme" field in the downlink control information format N0 being "1110" or "1111" represents the second feedback (where "1110" or "1111" is a state that is not used to indicate the modulation coding scheme); and a value of a "modulation coding scheme" field in the downlink control information format N1 being "1110" or "1111" represents the third feedback. "11xx" represents that values of two high order bits in four bits are "11".

In a manner two, the first feedback is indicated via a field in the common downlink control information; the second feedback and the third feedback are indicated via a field in the first terminal-specific downlink control information; where the field in the first terminal-specific downlink control information being a first value represents the second feedback, and the field in the first terminal-specific downlink control information being a second value represents the third feedback.

For example, using an MTC system with a 10 MHz system bandwidth and a 1.4 MHz terminal transmission bandwidth as an example, a specified bit value in the common downlink control information being "1" represents the first feedback; a value of a "resource allocation" field in the downlink control information format 6-0A being "00010101" represents the second feedback, and the value of the "resource allocation" field in the downlink control information format 6-0A being "00010110" represents the third feedback (where "00010110" and "00010110" are states that are not used to indicate the resource allocation); and a value of a "modulation coding scheme" field in the downlink control information format 6-0B being "1011" represents the second feedback, and a value thereof being "1100" represents the third feedback (where "1011" and "1100" are states that are not used for indicating the modulation coding scheme). Using an NB-IoT system as an example, a specified bit value in the common downlink control information being "1" represents the first feedback; and a value of a "modulation coding scheme" field in the downlink control information format N0 being "1110" represents the second feedback, and a value thereof being "1111" represents the third feedback (where "1110" and "1111" are states that are not used for indicating the modulation coding scheme).

In a manner three, the first feedback is indicated via a field in the common downlink control information; the second feedback and the third feedback are indicated via a field in the second terminal-specific downlink control information; where the field in the second terminal-specific downlink control information being a first value represents the second feedback, and the field in the second terminal-specific downlink control information being a second value represents the third feedback.

For example, using an MTC system with a 10 MHz system bandwidth and a 1.4 MHz terminal transmission bandwidth as an example, a specified bit value in the common downlink control information being "1" represents the first feedback; a value of a "resource allocation" field in the downlink control information format 6-1A being "00010101" represents the second feedback, and a value of the "resource allocation" field in the downlink control information format 6-1A being "00010110" represents the third feedback (where "00010110" and "00010110" are states that are not used for indicating the resource allocation); and a value of a "modulation coding scheme" field in the downlink control information format 6-1B being "1011" represents the second feedback, and a value thereof being "1100" represents the third feedback (where "1011" and "1100" are states that are not used for indicating the modulation coding scheme). Using an NB-IoT system as an example, a specified bit value in the common downlink control information being "1" represents the first feedback; and a value of a "modulation coding scheme" field in the downlink control information format N1 being "1110" represents the second feedback, and a value thereof being "1111" represents the third feedback (where "1110" and "1111" are states that are not used to indicate the modulation coding scheme).

In a manner four, the first feedback is indicated via a field in the first terminal-specific downlink control information; the second feedback and the third feedback are indicated via a field in the second terminal-specific downlink control information; where the field in the second terminal-specific downlink control information being a first value represents the second feedback, and the field in the second terminal-specific downlink control information being a second value represents the third feedback.

For example, using an MTC system with a 10 MHz system bandwidth and a 1.4 MHz terminal transmission bandwidth as an example, a value of a "resource allocation" field in the downlink control information format 6-0A being "00010101" or "00011111" represents the first feedback (where "00010101" or "00011111" is a state that is not used for indicating the resource allocation), and a value of a "modulation coding scheme" field in the downlink control information format 6-0B being "1011", "1111" or "11xx" represents the first feedback (where "1011", "1111" or "11xx" is a state that is not used for indicating the modulation coding scheme); a value of a "resource allocation" field in the downlink control information format 6-1A being "00010101" represents the second feedback, and a value of the "resource allocation" field in the downlink control information format 6-1A being "00010110" represents the third feedback (where "00010110" and "00010110" are states that are not used to indicate the resource allocation); and a value of a "modulation coding scheme" field in the downlink control information format 6-1B being "1011" represents the second feedback, and a value thereof being "1100" represents the third feedback (where "1011" and "1100" are states that are not used for indicating the modulation coding scheme). Further using an NB-IoT system as an example, a value of a "modulation coding scheme" field in the downlink control information format N0 being "1110" or "1111" represents the first feedback (where "1110" or "1111" is a state that is not used to indicate the modulation coding scheme); and a value of a "modulation coding scheme" field in the downlink control information format N1 being "1110" represents the second feedback, and a value thereof being "1111" represents the third feedback (where "1110" and "1111" are states that are not used for indicating the modulation coding scheme).

In a manner five, the first feedback and the second feedback are indicated via a field in the first terminal-specific downlink control information; the third feedback is indicated via a field in the second terminal-specific downlink control information; where the field in the first terminal-specific downlink control information being a first value represents the first feedback, and the field in the first terminal-specific downlink control information being a second value represents the second feedback.

For example, using an MTC system with a 10 MHz system bandwidth and a 1.4 MHz terminal transmission bandwidth as an example, a value of a "resource allocation" field in the downlink control information format 6-0A being "00010101" represents the first feedback, and a value of the "resource allocation" field in the downlink control information format 6-0A being "00010110" represents the second feedback (where "00010110" and "00010110" are states that are not used to indicate the resource allocation); a value of a "modulation coding scheme" field in the downlink control information format 6-0B being "1011" represents the first feedback, and a value thereof being "1100" represents the second feedback (where "1011" and "1100" are states that are not used to indicate the modulation coding scheme); and a value of a "resource allocation" field in the downlink control information format 6-1A being "00010101" or "00011111" represents the third feedback (where "00010101" or "00011111" is a state that is not used to indicate the resource allocation), and a value of a "modulation coding scheme" field in the downlink control information format 6-1B being "1011", "1111" or "11xx" represents the third feedback (where "1011", "1111" or "11xx" is a state that is not used for indicating the modulation coding scheme). Further using an NB-IoT system as an example, a value of a "modulation coding scheme" field in the downlink control information format N0 being "1110" represents the first feedback, and a value thereof being "1111" represents the second feedback (where "1110" and "1111" are states that are not used to indicate the modulation coding scheme); and a value of a "modulation coding scheme" field in the downlink control information format N1 being "1110" or "1111" represents the third feedback (where "1110" or "1111" is a state that is not used to indicate the modulation coding scheme).

In a manner six, the first feedback, the second feedback and the third feedback are indicated via a field in the first terminal-specific downlink control information. When the field in the first terminal-specific downlink control information is a first value, it represents the first feedback. When the field in the first terminal-specific downlink control information is a second value, it represents the second feedback. When the field in the first terminal-specific downlink control information is a third value, it represents the third feedback.

For example, using an MTC system with a 10 MHz system bandwidth and a 1.4 MHz terminal transmission bandwidth as an example, a value of a "resource allocation" field in the downlink control information format 6-0A being "00010101" represents the first feedback, a value of the "resource allocation" field in the downlink control information format 6-0A being "00010110" represents the second feedback, and a value of the "resource allocation" field in the downlink control information format 6-0A being "00010111" represents the third feedback ("00010110", "00010110" and "00010111" are states that are not used for indicating the resource allocation). A value of a "modulation coding scheme" field in the downlink control information format 6-0B being "1011" represents the first feedback, a value of the "modulation coding scheme" field in the downlink control information format 6-0B being "1100" represents the second feedback, and a value of the "modulation coding scheme" field in the downlink control information format 6-0B being "1101" represents the third feedback ("1011", "1100" and "1101" are states that are not used for indicating the modulation coding scheme).

When two types of feedback exist, first feedback and second feedback are distinguished in one of following manners.

In a manner one, the first feedback is indicated via a field in the common downlink control information, and the second feedback is indicated via a field in the first terminal-specific downlink control information.

For example, using an MTC system with a 10 MHz system bandwidth and 1.4 MHz terminal transmission bandwidth as an example, a specified bit value in the common downlink control information being "1" represents the first feedback; a value of a "resource allocation" field in the downlink control information format 6-0A being "00010101" or "00011111" represents the second feedback (where "00010101" or "00011111" is a state that is not used to indicate the resource allocation); and a value of a "modulation coding scheme" field in the downlink control information format 6-0B being "1011", "1111" or "11xx" represents the second feedback (where "1011", "1111" or "11xx" is a state that is not used to indicate the modulation coding scheme). Using an NB-IoT system as an example, a specified bit value in the common downlink control information being "1" represents the first feedback; and a value of a "modulation coding scheme" field in the downlink control information format N0 being "1110" or "1111" represents the second feedback (where "1110" or "1111" is a state that is not used to indicate the modulation coding scheme). "11xx" represents that values of two high order bits in four bits are "11".

In a manner two, the first feedback is indicated via a field in the common downlink control information, and the second feedback is indicated via a field in the second terminal-specific downlink control information.

For example, using an MTC system with a 10 MHz system bandwidth and a 1.4 MHz terminal transmission bandwidth as an example, a specified bit value in the common downlink control information being "1" represents the first feedback; a value of a "resource allocation" field in the downlink control information format 6-1A being "00010101" or "00011111" represents the second feedback; and a value of a "modulation coding scheme" field in the downlink control information format 6-1B being "1011", "1111" or "11xx" represents the second feedback. Further using an NB-IoT system as an example, a specified bit value in the common downlink control information being "1" represents the first feedback; and a value of a "modulation coding scheme" field in the downlink control information format N1 being "1110" or "1111" represents the second feedback (where "1110" or "1111" is a state that is not used to indicate the modulation coding scheme).

In a manner three, the first feedback is indicated via a field in the first terminal-specific downlink control information; and the second feedback is indicated via a field in the second terminal-specific downlink control information.

For example, using an MTC system with a 10 MHz system bandwidth and 1.4 MHz terminal transmission bandwidth as an example, a value of a "resource allocation" field in the downlink control information format 6-0A being "00010101" or "00011111" represents the first feedback (where "00010101" or "00011111" is a state that is not used to indicate the resource allocation), and a value of a "modulation coding scheme" field in the downlink control information format 6-0B being "1011", "1111" or "11xx" represents the first feedback (where "1011", "1111" or "11xx" is a state that is not used to indicate the modulation coding scheme); and a value of a "resource allocation" field in the downlink control information format 6-1A being "00010101" or "00011111" represents the second feedback, and a value of a "modulation coding scheme" field in the control information format 6-1B being "1011", "1111" or "11xx" represents the second feedback. Further using an NB-IoT system as an example, a value of a "modulation coding scheme" field in the downlink control information format N0 being "1110" or "1111" represents the first feedback (where "1110" or "1111" is a state that is not used to indicate the modulation coding scheme); and a value of a "modulation coding scheme" field in the downlink control information format N1 being "1110" or "1111" represents the second feedback. "11xx" represents that values of two high order bits in four bits are "11".

In a manner four, the first feedback and the second feedback are indicated via a field in the first terminal-specific downlink control information. When the field in the first terminal-specific downlink control information is a first value, it represents the first feedback, and when the field in the first terminal-specific downlink control information is a second value, it represents the second feedback.

For example, using an MTC system with a 10 MHz system bandwidth and 1.4 MHz terminal transmission bandwidth as an example, when a value of a "resource allocation" field in the downlink control information format 6-0A is "00010101" it represents the first feedback, and when the value of the "resource allocation" field in the downlink control information format 6-0A is "00010110", it represents the second feedback (where "00010110" and "00010110" are states that are not used to indicate the resource allocation). When a value of a "modulation coding scheme" field in the downlink control information format 6-0B is "1011", it represents the first feedback, and when the value of the "modulation coding scheme" field in the downlink control information format 6-0B is "1100", it represents the second feedback (where "1011" and "1100" are states that are not used to indicate the modulation coding scheme). Using an NB-IoT system as an example, when a value of a "modulation coding scheme" field in the downlink control information format N0 is "1110", it represents the first feedback, and when the value of the "modulation coding scheme" field in the downlink control information format N0 is "1111", it represents the second feedback (where "1110" and "1111" are states that are not used to indicate the modulation coding scheme).

Solution Two

The transmission of downlink data is used for terminating the transmission of uplink data. When the downlink data is downlink control information for scheduling a message 4, the uplink data is a message 3; and when the downlink data is downlink control information for scheduling a message 2, the uplink data is a message 1.

Through this solution, in the random access process, when the base station successfully decodes the message 3 or the message 1 early, the terminal may terminate transmission of the message 3 or message 1 early, thereby avoiding unnecessary loss of uplink resources and terminal sending power.

This solution includes following embodiments.

Embodiment 2-1

In this embodiment, in the transmission of the message 3, the base station, after successfully decoding the message 3, sends the downlink control information for scheduling the message 4 to the terminal. The terminal receives the downlink control information for scheduling the message 4. When the downlink control information is received, the transmission of the message 3 is terminated early.

First Application Example

In this example, the terminal reports to the base station via a field in the message 3 that the terminal supports the function of "receiving the downlink control information for scheduling the message 4 during the transmission of the message 3". The base station schedules the terminal to transmit the massage 3 and indicates that the number of transmission repetitions of the massage 3 is 1024. Since the terminal is allowed to terminate the massage 3 transmission in advance, the 1024 repetitions may be considered as the maximum number of transmission repetitions of the massage 3 or maximum transmission time of the massage 3. A repetition may correspond to at least one subframe.

In the transmission of the massage 3, the terminal receives the downlink control information for scheduling the message 4 over at most three search spaces until the terminal receives the downlink control information for scheduling the message 4; where the above three search spaces start from the start of the 257-th, 513-th and 769-th repetitions respectively. If the base station successfully decodes the message 3and determines, via the field in the message 3, that the terminal supports the function of "receiving the downlink control information for scheduling the message 4 during the period of transmission of the message 3", the base station selects one of the above three search spaces to send the downlink control information for scheduling the message 4. For example, if the base station successfully decodes the message 3 before the start time of the 257-th repetition, the downlink control information for scheduling the message 4 is sent over a first search space; if the base station successfully decodes the message 3 after the start time of the 257-th repetition and before the start time of the 513-th repetition, the downlink control information for scheduling the message 4 is sent over a second search space; and if the base station successfully decodes the message 3after the start time of the 513-th repetition and before the start time of the 769-th repetition, the downlink control information for scheduling the message 4 is sent over a third search space.

In this example, the base station successfully decodes the message 3 before the start time of the 257-th repetition and determines that the terminal supports the function of "receiving the downlink control information for scheduling the message 4 during the period of transmission of the message 3" via the field in the message 3, and the base station sends the downlink control information for scheduling the message 4 over the first search space. The terminal, after receiving the downlink control information for scheduling the message 4 over the first search space, terminates the transmission of the message 3 before the end of a fourth subframe after the end of the transmission of the downlink control information.

Second Application Example

In this example, the terminal, after completing the random access, reports to the base station via a field in an RRC message that the terminal supports the function of "receiving the downlink control information for scheduling the message 4 during the period of transmission of the message 3". The base station, after determining that the terminal supports the function via an RRC message from the terminal, configures a position of a first carrier to the terminal via the RRC message; and accordingly, the terminal determines the position of the first carrier via an RRC message from the base station, and sends the message 3 on the first carrier in the subsequent random access. Then, the base station schedules the terminal to transmit the message 3 and indicates that the number of repetitions of transmission of the message 3 is 1024; and the terminal sends the message 3 on the first carrier. Since the terminal is allowed to terminate the massage 3 transmission in advance, the 1024 repetitions may be considered as the maximum number of repetitions of massage 3 transmission or maximum transmission time of massage 3 transmission, where a repetition may correspond to at least one subframe.

In the period of massage 3 transmission, the terminal receives the downlink control information for scheduling the message 4 over at most three search spaces until the terminal receives the downlink control information for scheduling the message 4; where the above three search spaces start from the start of the 257-th, 513-th and 769-th repetitions respectively. If the base station successfully decodes the message 3, the base station selects one of the above three search spaces to send the downlink control information for scheduling the message 4. For example, if the base station successfully decodes the message 3 before the start time of the 257-th repetition, the downlink control information for scheduling the message 4 is sent over a first search space; if the base station successfully decodes the message 3 after the start time of the 257-th repetition and before the start time of the 513-th repetition, the downlink control information for scheduling the message 4 is sent over a second search space; and if the base station successfully decodes the message 3 after the start time of the 513-th repetition and before the start time of the 769-th repetition, the downlink control information for scheduling the message 4 is sent over a third search space.

In this example, the base station successfully decodes the message 3 before the start time of the 257-th repetition. In this case, the base station sends the downlink control information for scheduling the message 4 over the first search space; and the terminal, after receiving the downlink control information for scheduling the message 4 over the first search space, terminates the transmission of the message 3 before the end of a second or fourth subframe after the end of the transmission of the downlink control information.

Embodiment 2-2

In this embodiment, in the period of transmission of the message 1, the base station, after successfully detecting the message 1, sends the downlink control information for scheduling the message 2 to the terminal. The terminal receives the downlink control information for scheduling the message 2. When the downlink control information is received, the transmission of the message 1 is terminated in advance.

First Application Example

In this example, the terminal reports to the base station via a sequence used by the message 1 that the terminal supports the function of "receiving the downlink control information for scheduling the message 2 during the period of transmission of the message 1". The terminal transmits the message 1 according to 128 transmission repetitions. Since the terminal is allowed to terminate the massage 1 transmission early, the 128 repetitions may be considered as the maximum number of transmission repetitions of the massage 1 or maximum transmission time of the massage 1, where a repetition corresponds to at least one subframe.

In the period of massage 1 transmission, the terminal receives the downlink control information for scheduling the message 2 over one search space; where the above search space starts from the start of the 64-th transmission repetition of the message 1. In this example, the base station successfully detects the message 1 before the start time of the 64-th transmission repetition of the message 1 and determines that the terminal supports the function of "receiving the downlink control information for scheduling the message 2 during the period of transmission of the message 1" via the sequence used by the message 1. In this case, the base station sends the downlink control information for scheduling the message 2 over the search space; and accordingly, the terminal, after receiving the downlink control information for scheduling the message 2 over the search space, terminates the transmission of the message 1 before the end of a second subframe after the end of the transmission of the downlink control information.

Second Application Example

In this example, the terminal, after completing the random access, reports to the base station via a field in an RRC message that the terminal supports the function of "receiving the downlink control information for scheduling the message 2 during the period of transmission of the message 1". The base station, after determining that the terminal supports the function via an RRC message from the terminal, configures a position of a first carrier to the terminal via the RRC message; and the terminal determines the position of the first carrier via an RRC message from the base station, and sends the message 1 on the first carrier in the subsequent random access.

In this example, the terminal transmits the message 1 on the first carrier according to 128 transmission repetitions. Since the terminal is allowed to terminate message 1 transmission early, the 128 repetitions may be considered as the maximum number of repetitions of the message 1 transmission or maximum transmission time of the message 1 transmission; where a repetition corresponds to at least one subframe. In the transmission of the massage 1, the terminal receives the downlink control information for scheduling the message 2 over one search space; where the above search space starts from the start of the 64-th transmission repetition of the message 1. The base station detects the message 1 before the start of the 64-th repetition transmission of the message 1. In this case, the base station sends the downlink control information for scheduling the message 2 over the search space, and the terminal, after receiving the downlink control information for scheduling the message 2 over the search space, terminates the transmission of the message 1 before the end of a second or fourth subframe after the end of the transmission of the downlink control information.

Solution Three

In a manner one, in the period of PUSCH transmission, the terminal receives second downlink control information over a second search space, and refuses to receive first downlink control information over a first search space; where the second downlink control information includes downlink control information carrying feedback If the number Y of second search spaces monitored by the terminal from the start of PUSCH transmission to the end of PUSCH transmission is greater than the number X of first search spaces from the start of PUSCH transmission to the end of PUSCH transmission, the terminal refuses to receive the first downlink control information over (Y-X) consecutive first search spaces after the end of the PUSCH transmission.

In a manner two, within the maximum PUSCH transmission time range, the terminal receives second downlink control information over a second search space, and refuses to receive first downlink control information over a first search space; where the second downlink control information includes downlink control information bearing feedback. If the number Y of second search spaces monitored by the terminal is greater than the number X of first search spaces within the maximum PUSCH transmission time range, the terminal refuses to receive the first downlink control information over (Y-X) consecutive first search spaces after the maximum PUSCH transmission time.

In a manner three, within the maximum PUSCH transmission time range, the terminal receives second downlink control information over a second search space, and refuses to receive first downlink control information over a first search space. The number P of candidate sets in the second search space is less than the number Q of candidate sets in the first search space. If the total number Y of candidate sets in all second search spaces monitored by the terminal is greater than the total number X of candidate sets in all first search spaces within the maximum PUSCH transmission time range, upon receiving the first downlink control information over W consecutive first search spaces after the maximum PUSCH transmission time, the terminal detects the first downlink control information only on P candidate sets in each of the W consecutive first search spaces.

In this embodiment of the present application, the feedback includes ACK feedback corresponding to the PUSCH.

In this embodiment of the present application, the first search space always appears according to a fixed cycle (which does not depends on whether the PUSCH transmission exists); and the base station configures a cycle of the first search space to the terminal via an RRC connection setup message. The second search space only appears in the period of PUSCH transmission or only appears within the maximum PUSCH transmission time range; and the object is to transmit the second downlink control information including feedback. A time domain position of the second search space is determined in one of following manners: adopting a pre-defined time domain position (for example, the second search space starts from start moments of the (R/4+1)-th, (R/2+1)-th and (3R/4+1)-th repetitions of PUSCH transmission, where R denotes the number of repetitions of PUSCH transmission); configuring via an RRC message; or indicating via a field in the first downlink control information.

In this embodiment of the present application, the first downlink control information is downlink control information transmitted over the first search space; and the second downlink control information is downlink control information transmitted over the second search space.

In this embodiment, the terminal receives the feedback over the second search space such that the terminal may terminate the PUSCH transmission early if the base station decodes the PUSCH data early; and this method does not increase the total number of times of blind detection, and avoids unnecessary loss of terminal receiving power.

Embodiment 3-1

In this embodiment, in the period of PUSCH transmission, the terminal receives second downlink control information carrying ACK feedback over a second search space, and refuses to receive first downlink control information over a first search space. If the number Y of second search spaces monitored by the terminal from the start of PUSCH transmission to the end of PUSCH transmission is greater than the number X of first search spaces from the start of PUSCH transmission to the end of PUSCH transmission, the terminal refuses to receive the first downlink control information over (Y–X) consecutive first search spaces after the end of the PUSCH transmission. The base station sends the second downlink control information for carrying ACK feedback over the second search space. If the number Y of second search spaces monitored by the terminal from the start of PUSCH transmission to the end of PUSCH transmission is greater than the number X of first search spaces from the start of PUSCH transmission to the end of PUSCH transmission, the base station refuses to send the first downlink control information to the terminal over (Y–X) consecutive first search spaces after the end of the PUSCH transmission.

Application Example

Figure 7:
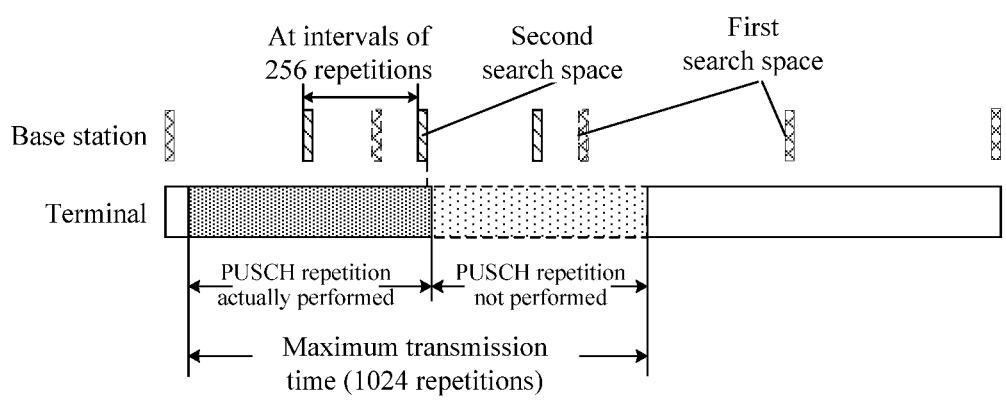
FIG. 7 is a schematic diagram one showing transmission of ACK feedback during a PUSCH transmission in this example.

FIG. 7 is a schematic diagram one of transmission of ACK feedback during a period of PUSCH transmission in this example; where the search space indicated by the dashed box represents a search space which the terminal does not monitor.

Before PUSCH transmission, the base station sends first downlink control information over a first search space; and the terminal receives the first downlink control information over the first search space; where the first downlink control information includes downlink control information for scheduling the terminal to transmit the PUSCH. In this example, the base station schedules the terminal to transmit the PUSCH and indicates that the number of repetitions of PUSCH transmission is 1024. Since the terminal is allowed to terminate PUSCH transmission early, the 1024 repetitions may be considered as the maximum number of repetitions of PUSCH transmission or maximum transmission time of PUSCH transmission; where a repetition corresponds to at least one subframe.

In the period of PUSCH transmission, the base station sends second downlink control information over a second search space; and the terminal receives the second downlink control information over the second search space; where the second downlink control information includes downlink control information for carrying ACK feedback. In this example, the terminal receives the second downlink control information over at most three second search spaces until the terminal receives the downlink control information carrying ACK feedback, and refuses receiving the first downlink control information over the first search space; where the above three second search spaces start from the start time of the 257-th, 513-th and 769-th repetitions respectively.

If the PUSCH data is successfully decoded, the base station selects one of the three second search spaces to send the downlink control information carrying ACK feedback. For example, if the base station successfully decodes the PUSCH data before the start of the 257-th repetition, the base station sends the downlink control information carrying ACK feedback over a first second search space; and the number of second search spaces monitored by the terminal is 1. If the base station successfully decodes the PUSCH data after the start of the 257-th repetition and before the start of the 513-th repetition, the base station sends the downlink control information carrying ACK feedback over a second search space; and the number of second search spaces monitored by the terminal is 2. The terminal receives the downlink control information carrying ACK feedback over the second search space. If the base station successfully decodes the PUSCH data after the start of the 513-th repetition and before the start of the 769-th repetition, the base station sends the downlink control information carrying ACK feedback over a third second search space; and the number of second search spaces monitored by the terminal is 3. The downlink control information carrying ACK feedback is received over the third second search space.

In this example, the base station successfully decodes the PUSCH data after the start of the 257-th repetition and before the start of the 513-th repetition; and the base station sends the downlink control information carrying ACK feedback over the second search space. The terminal, after receiving the downlink control information carrying ACK feedback over the second search space, terminates the ongoing PUSCH transmission before the end of a second or fourth subframe after the end of the transmission of the downlink control information. In the period of PUSCH transmission, the number of first search spaces that the terminal gives up monitoring is 1, and this first search space is located between first two second search spaces.

After PUSCH transmission, the base station sends the first downlink control information over the first search space, and the terminal receives the first downlink control information over the first search space, where the first downlink control information includes downlink control information for scheduling the terminal to transmit the PUSCH. From the start of PUSCH transmission to the end of PUSCH transmission, if the number Y of second search spaces monitored by the terminal is greater than the number X of first search spaces from the start of PUSCH transmission to the end of PUSCH transmission, the terminal refuses to receive the first downlink control information over (Y–X) consecutive first search spaces after the end moment of the PUSCH transmission, and the base station refuses to send the first downlink control information to the terminal over (Y–X) consecutive first search spaces after the end of the PUSCH transmission. In this example, from the start of PUSCH transmission to the end of PUSCH transmission, if the number (Y=2) of second search spaces monitored by the terminal is greater than the number (X=1) of first search spaces from the start of PUSCH transmission to the end of PUSCH transmission, the base station refuses to send the first downlink control information over the first search space after the end of the PUSCH transmission; and accordingly, the terminal refuses to receive the first downlink control information over the first search space after the end moment of the PUSCH transmission.

Another Application Example

Figure 8:
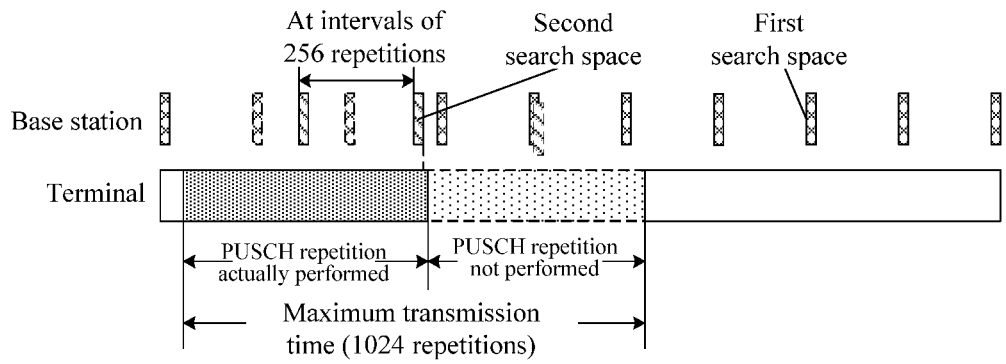
FIG. 8 is a schematic diagram two showing transmission of ACK feedback during a PUSCH transmission in this example.

FIG. 8 is a schematic diagram two of transmission of ACK feedback during the PUSCH transmission in this example; where the search space indicated by the dashed box represents a search space not monitored by the terminal.

In this example, the base station successfully decodes the PUSCH data after the start time of the 257-th repetition and before the start time of the 513-th repetition; and the base station sends the downlink control information carrying ACK feedback over a second search space. The terminal, after receiving the downlink control information carrying ACK feedback over the second search space, terminates the ongoing PUSCH transmission before the end of a second or fourth subframe after the end of the transmission of the downlink control information. In the period of PUSCH transmission, the number of first search spaces not monitored by the terminal is 2, and the position of these two search spaces is shown by dashed squares in FIG. 8.

After PUSCH transmission, the base station sends the first downlink control information over the first search space; and the terminal receives the first downlink control information over the first search space; where the first downlink control information includes downlink control information for scheduling the terminal to transmit the PUSCH. From the start of PUSCH transmission to the end of PUSCH transmission, if the number Y of second search spaces monitored by the terminal is greater than the number X of first search spaces from the start of PUSCH transmission to the end of PUSCH transmission, the terminal refuses to receive the first downlink control information over (Y−X) consecutive first search spaces after the end moment of the PUSCH transmission, and the base station refuses to send the first downlink control information to the terminal over (Y−X) consecutive first search spaces after the end of the PUSCH transmission. In this example, from the start of PUSCH transmission to the end of PUSCH transmission, if the number (Y=2) of second search spaces monitored by the terminal is equal to the number (X=2) of first search spaces from the start of PUSCH transmission to the end of PUSCH transmission, the base station sends the first downlink control information over the first search space after the end of the PUSCH transmission; and accordingly, the terminal receives the first downlink control information over the first search space after the end of the PUSCH transmission, that is, the terminal does not refuse receiving the first downlink control information over at least one first search space after the end of PUSCH transmission.

Embodiment 3-2

In this embodiment, within the maximum PUSCH transmission time range, the terminal receives the second downlink control information for carrying ACK feedback over the second search space, and refuses to receive the first downlink control information over the first search space; where if the number Y of second search spaces monitored by the terminal is greater than the number X of first search spaces within the maximum PUSCH transmission time range, the terminal refuses to receive the first downlink control information over (Y−X) consecutive first search spaces after the maximum PUSCH transmission time.

The base station sends the second downlink control information for carrying ACK feedback over the second search space. If the number Y of second search spaces monitored by the terminal is greater than the number X of first search spaces within the maximum PUSCH transmission time range, the base station refuses to send the first downlink control information to the terminal over (Y−X) consecutive first search spaces after the maximum PUSCH transmission time.

Application Example

Figure 9:
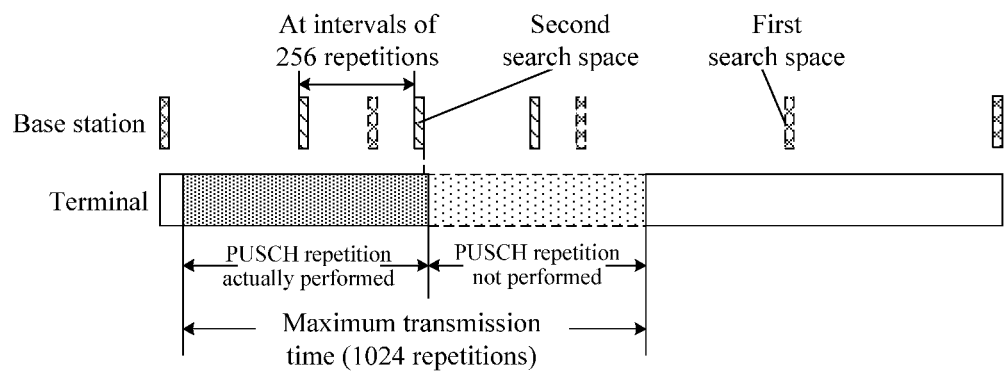
FIG. 9 is a schematic diagram one showing transmission of ACK feedback within a maximum PUSCH transmission time range in this example.

FIG. 9 is a schematic diagram one of transmission of ACK feedback within a maximum PUSCH transmission time range in this example, where the search space indicated by the dashed box represents a search space not monitored by the terminal.

Before the PUSCH transmission, the base station sends first downlink control information over a first search space; and the terminal receives the first downlink control information over the first search space; where the first downlink control information includes downlink control information for scheduling the terminal to transmit the PUSCH. In this example, the base station schedules the terminal to transmit the PUSCH and indicates that the number of repetitions of PUSCH transmission is 1024. Since the terminal is allowed to terminate PUSCH transmission early, the 1024 repetitions may be considered as the maximum number of repetitions of PUSCH transmission or maximum transmission time of PUSCH transmission; where a repetition corresponds to at least one subframe.

Within the maximum PUSCH transmission time range (i.e., 1024 repetitions), the base station sends second downlink control information over a second search space; and the terminal receives the second downlink control information over the second search space. The second downlink control information includes downlink control information for carrying ACK feedback. In this example, the terminal receives the second downlink control information (including the downlink control information for carrying ACK feedback) over three second search spaces, and refuses to receive the first downlink control information over the first search space. The above three second search spaces start from the start time of the 257-th, 513-th and 769-th repetitions respectively. If the PUSCH data is successfully decoded, the base station selects one of the three second search spaces to send the downlink control information carrying ACK feedback. For example, if the base station successfully decodes the PUSCH data after the start of the 257-th repetition, the base station sends the downlink control information carrying ACK feedback over the first second search space. The terminal, after receiving the downlink control information carrying ACK feedback over the first second search space, continues to receive second downlink control information over second and third second search spaces. If the base station successfully decodes the PUSCH data after the start time of the 257-th repetition and before the start time of the 513-th repetition, the base station sends the downlink control information carrying ACK feedback over a second search space; and the terminal, after receiving the downlink control information carrying ACK feedback over the second search space, continues to receive second downlink control information over a third second search space. If the base station successfully decodes the PUSCH data after the start time of the 513-th repetition and before the start time of the 769-th repetition, the base stations sends the downlink control information carrying ACK feedback over a third second search space, and the terminal receives the downlink control information carrying ACK feedback over the third second search space. In other words, the second search space on which the terminal receives the ACK feedback does not impact the operation in which the terminal receives the second downlink control information over three second search spaces within the maximum PUSCH transmission time range (i.e., 1024 repetitions).

In this example, the base station successfully decodes the PUSCH data after the start time of the 257-th repetition and before the start time of the 513-th repetition; and the base station sends the downlink control information carrying ACK feedback over the second search space. The terminal, after receiving the downlink control information carrying ACK feedback over the second search space, terminates the ongoing PUSCH transmission before the end of a second or fourth subframe after the end of the transmission of the downlink control information, and continues to receives the second downlink control information over the third second search space. Within the maximum PUSCH transmission time range, the number of first search spaces that the terminal refuses to monitor is 2.

After the maximum PUSCH transmission time range, the base station sends the first downlink control information over the first search space; and the terminal receives the first downlink control information over the first search space; where the first downlink control information includes downlink control information for scheduling the terminal to transmit the PUSCH. Within the maximum PUSCH transmission time range, if the number Y of second search spaces is greater than the number X of first search spaces, the terminal refuses to receive the first downlink control information over (Y−X) consecutive first search spaces after the maximum PUSCH transmission time, and the base station refuses to send the first downlink control information to the terminal over (Y−X) consecutive first search spaces after the maximum PUSCH transmission time. In this example, within the maximum PUSCH transmission time range, if the number (Y=3) of second search spaces monitored by the terminal is greater than the number (X=2) of first search spaces within the maximum PUSCH transmission time range, the base station refuses to send the first downlink control information over a first search space after the maximum PUSCH transmission time, and the terminal refuses to receive the first downlink control information over the first search space after the maximum PUSCH transmission time.

Another Application Example

Figure 10:
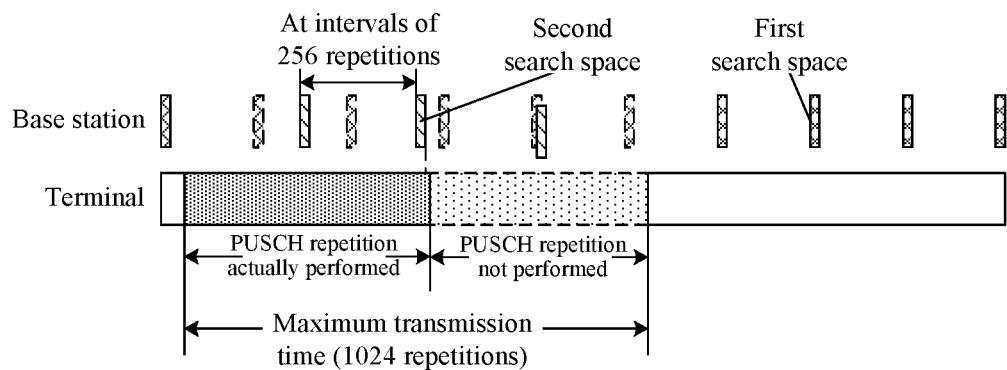
FIG. 10 is a schematic diagram two showing transmission of ACK feedback within a maximum PUSCH transmission time range in this example.

FIG. 10 is a schematic diagram two of transmission of ACK feedback within a maximum PUSCH transmission time range in this example; where the search space indicated by the dashed box represents a search space not monitored by the terminal.

In this example, the base station successfully decodes the PUSCH data after the start of the 257-th repetition and before the start of the 513-th repetition; and the base station sends the downlink control information carrying ACK feedback over a second search space. The terminal, after receiving the downlink control information carrying ACK feedback over the second search space, terminates the ongoing PUSCH transmission before the end of a second or fourth subframe after the end of the transmission of the downlink control information, and continues to receives the second downlink control information over the third second search space. Within the maximum PUSCH transmission time range, the number of first search spaces that the terminal refuses to monitor is 5.

After the maximum PUSCH transmission time range, the base station sends the first downlink control information over the first search space; and the terminal receives the first downlink control information over the first search space; where the first downlink control information includes downlink control information for scheduling the terminal to transmit the PUSCH. Within the maximum PUSCH transmission time range, if the number Y of second search spaces is greater than the number X of first search spaces, the terminal refuses to receive the first downlink control information over (Y−X) consecutive first search spaces after the maximum PUSCH transmission time, and the base station refuses to send the first downlink control information to the terminal over (Y−X) consecutive first search spaces after the maximum PUSCH transmission time. In this example, within the maximum PUSCH transmission time range (i.e., 1024 repetitions), if the number (Y=3) of second search spaces monitored by the terminal is less than the number (X=5) of first search spaces within the maximum PUSCH transmission time range, the base station sends the first downlink control information over a first search space after the maximum PUSCH transmission time, and the terminal receives the first downlink control information over the first search space after the maximum PUSCH transmission time, that is, the terminal does not refuse receiving the first downlink control information over at least one first search space after the maximum PUSCH transmission time.

Embodiment 3-3

Within the maximum PUSCH transmission time range, the terminal receives second downlink control information over a second search space, and refuses to receive first downlink control information over a first search space; where the second downlink control information includes downlink control information for carrying ACK feedback. The number P of candidate sets in the second search space is less than the number Q of candidate sets in the first search space. If the total number Y of candidate sets in all second search spaces monitored by the terminal is greater than the total number X of candidate sets in all first search spaces within the maximum PUSCH transmission time range, when the terminal receives the first downlink control information over W consecutive first search spaces after the maximum PUSCH transmission time, the terminal detects the first downlink control information only in a range of P candidate sets in each of the W consecutive first search spaces.

The base station sends second downlink control information over the second search space, and refuses to send first downlink control information over the first search space, where the second downlink control information includes downlink control information for carrying ACK feedback. The number P of candidate sets in the second search space is less than the number Q of candidate sets in the first search space. If the total number Y of candidate sets in all second search spaces monitored by the terminal is greater than the total number X of candidate sets in all first search spaces within the maximum PUSCH transmission time range, when the base station sends the first downlink control information over W consecutive first search spaces after the maximum PUSCH transmission time, the base station sends the first downlink control information only within a range of P candidate sets in each of the W consecutive first search spaces.

The P is equal to ceil(Q/2), ceil(Q/4), floor(Q/2) or floor(Q/4), and the W is equal to ceil[(Y−X)/(Q−P)] or floor[(Y−X)/(Q−P)]; where ceil and floor denote rounding up and rounding down respectively.

In this embodiment of the present application, one candidate set occupies all or part of time frequency resources of the search space; different candidate sets occupy different time frequency reduces; and the terminal performs at least one detection on one candidate set. Using a search space including 15 candidate sets as an example, a size of a frequency domain resource occupied by the search space is M resource blocks (e.g., 6) and a time domain resource size occupied by the search space is R subframes (e.g., 128). In this case, the 15 candidate sets in the search space may be as shown in Table 1 (where first and R-th subframes occupied by the search space are considered as subframes numbered 0 and R-1 respectively).

TABLE 1

| Candidate set No | Occupied time frequency resources (frequency domain resources × time domain resources) |
|---|---|
| 0 | all M resource blocks × subframes numbered 0 to R/8-1 |
| 1 | all M resource blocks × subframes numbered R/8 to 2R/8-1 |
| 2 | all M resource blocks × subframes numbered 2R/8 to 3R/8-1 |
| 3 | all M resource blocks × subframes numbered 3R/8 to 4R/8-1 |
| 4 | all M resource blocks × subframes numbered 4R/8 to 5R/8-1 |
| 5 | all M resource blocks × subframes numbered 5R/8 to 6R/8-1 |
| 6 | all M resource blocks × subframes numbered 6R/8 to 7R/8-1 |
| 7 | all M resource blocks × subframes numbered 7R/8 to R-1 |
| 8 | all M resource blocks × subframes numbered 0 to R/4-1 |
| 9 | all M resource blocks × subframes numbered R/4 to 2R/4-1 |
| 10 | all M resource blocks × subframes numbered 2R/4 to 3R/4-1 |
| 11 | all M resource blocks × subframes numbered 3R/4 to R-1 |
| 12 | all M resource blocks × subframes numbered 0 to R/2-1 |
| 13 | all M resource blocks × subframes numbered R/2 to R-1 |
| 14 | all M resource blocks × subframes numbered 0 to R-1 |

Application Example

Figure 11:
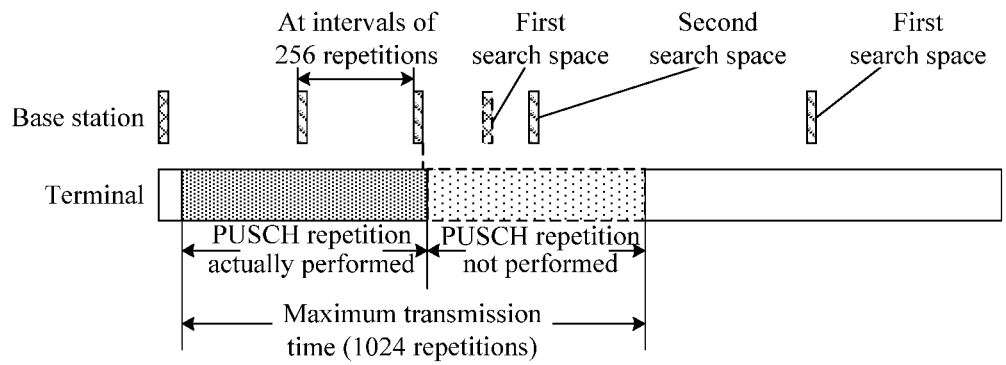
FIG. 11 is a schematic diagram three showing transmission of ACK feedback within a maximum PUSCH transmission time range in this example.

FIG. 11 is a schematic diagram three of transmission of ACK feedback within a maximum PUSCH transmission time range in this example; where the search space indicated by the dashed box represents a search space not monitored by the terminal, and the box filled with diagonal lines represents the first search space with P candidate sets.

Before PUSCH transmission, the base station sends first downlink control information over a first search space; and the terminal receives the first downlink control information over the first search space; where the first downlink control information includes downlink control information for scheduling the terminal to transmit the PUSCH. In this example, the base station schedules the terminal to transmit the PUSCH and indicates that the number of repetitions of PUSCH transmission is 1024. Since the terminal is allowed to terminate PUSCH transmission in advance, the 1024 repetitions may be considered as the maximum number of repetitions of PUSCH transmission or maximum transmission time of PUSCH transmission; where a repetition corresponds to at least one subframe.

Within the maximum PUSCH transmission time range (i.e., 1024 repetitions), the base station sends second downlink control information over a second search space; and the terminal receives the second downlink control information over the second search space; where the second downlink control information includes downlink control information carrying ACK feedback. In this example, the terminal receives the second downlink control information (including the downlink control information for carrying ACK feedback) over three second search spaces, and abandons receiving the first downlink control information over a first search space; where the above three second search spaces start from the start time of the 257-th, the start time of the 513-th and the start time of the 769-th repetitions respectively. If the PUSCH data is successfully decoded, the base station selects one of the three second search spaces to send the downlink control information carrying ACK feedback. For example, if the base station successfully decodes the PUSCH data after the start time of the 257-th repetition, the base station sends the downlink control information carrying ACK feedback over a first second search space; and the terminal, after receiving the downlink control information carrying ACK feedback over the first second search space, continues to receive second downlink control information over second and third second search spaces. If the base station successfully decodes the PUSCH data after the start time of the 257-th repetition and before the start time of the 513-th repetition, the base station sends the downlink control information carrying ACK feedback over the second search space; and the terminal, after receiving the downlink control information bearing ACK feedback over the second search space, continues to receive second downlink control information over a third second search space. If the base station successfully decodes the PUSCH data after the start time of the 513-th repetition and before the start time of the 769-th repetition, the base stations sends the downlink control information carrying ACK feedback over a third second search space; and the terminal receives the downlink control information carrying ACK feedback over the third second search space. In other words, the second search space on which the terminal receives the ACK feedback does not impact the operation in which the terminal receives the second downlink control information over three second search spaces within the maximum PUSCH transmission time range (i.e., 1024 repetitions).

In this example, the base station successfully decodes the PUSCH data after the start time of the 257-th repetition and before the start time of the 513-th repetition; and the base station sends the downlink control information carrying ACK feedback over the second search space. The terminal, after receiving the downlink control information carrying ACK feedback over the second search space, terminates the ongoing PUSCH transmission before the end of a second or fourth subframe after the end of the transmission of the downlink control information, and continues to receives the second downlink control information over the third second search space. Within the maximum PUSCH transmission time range, the number of first search spaces that the terminal refuses to monitor is 1.

After the maximum PUSCH transmission time range, the base station sends the first downlink control information over the first search space; and the terminal receives the first downlink control information over the first search space; where the first downlink control information includes downlink control information for scheduling the terminal to transmit the PUSCH. Within the maximum PUSCH transmission time range, if the total number Y of candidate sets in all second search spaces monitored by the terminal is greater than the total number X of candidate sets in all first search spaces within the maximum PUSCH transmission time range, when the terminal receives the first downlink control information over W consecutive first search spaces after the maximum PUSCH transmission time, the terminal detects the first downlink control information only in a range of P candidate sets in each of the W first search spaces; and accordingly, when the base station sends the first downlink control information over W consecutive first search spaces after the maximum PUSCH transmission time, the base station sends the first downlink control information only within a range of P candidate sets in each of the W consecutive first search spaces. In this example, the number Q of candidate sets in the first search space is 15, and the number P of candidate sets in the second search space is 7 (equal to floor(Q/2)). Within the maximum PUSCH transmission time range (i.e., 1024 repetitions), the number of second search spaces monitored by the terminal is 3, and the total number Y of candidate sets in all second search spaces is 21 (equal to 3×P), the number of first search spaces within the maximum PUSCH transmission time range is 1, and the total number X of candidate sets in all first search spaces is 15 (equal to 1×Q); that is, the total number Y (equal to 21) of candidate sets in all second search spaces monitored by the terminal is greater than the total number X (equal to 15) of candidate sets in all first search spaces within the maximum PUSCH transmission time range. In this example, since W is acquired according to an expression ceil[(Y−X)/(Q−P)], a value of W is 1. When the base station sends the first downlink control information over a first search space after the maximum PUSCH transmission time, the base station sends the first downlink control information only within a range of P (equal to 7) candidate sets in this first search space; and accordingly, when the terminal receives the first downlink control information over the first search space after the maximum PUSCH transmission time, the terminal detects the first downlink control information only within the range of P (equal to 7) candidate sets in this first search space.

If it is contemplated that Q (equal to 15) candidate sets are shown in Table 1, P (equal to 7) candidate sets may be shown in Table 2.

TABLE 2

| Candidate set No | Occupied time frequency resources (frequency domain resources × time domain resources) |
| --- | --- |
| 0 | all M resource blocks × subframes numbered 0 to R/8-1 |
| 1 | all M resource blocks × subframes numbered R/8 to 2R/8-1 |
| 2 | all M resource blocks × subframes numbered 2R/8 to 3R/8-1 |
| 3 | all M resource blocks × subframes numbered 0 to R/4-1 |
| 4 | all M resource blocks × subframes numbered R/4 to 2R/4-1 |
| 5 | all M resource blocks × subframes numbered 0 to R/2-1 |
| 6 | all M resource blocks × subframes numbered 0 to R-1 |

Another Application Example

Figure 12:
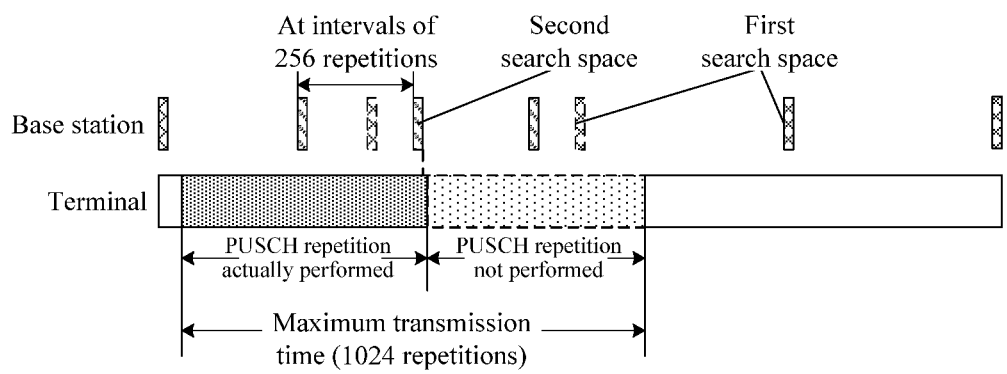
FIG. 12 is a schematic diagram four showing transmission of ACK feedback within a maximum PUSCH transmission time range in this example.

FIG. 12 is a schematic diagram four of transmission of ACK feedback within a maximum PUSCH transmission time range in this example; where the search space indicated by the dashed box represents a search space not monitored by the terminal.

In this example, the base station successfully decodes the PUSCH data after the start time of the 257-th repetition and before the start time of the 513-th repetition; and the base station sends the downlink control information carrying ACK feedback over the second search space. The terminal, after receiving the downlink control information carrying ACK feedback over the second search space, terminates the ongoing PUSCH transmission before the end of a second or fourth subframe after the end of the transmission of the downlink control information, and continues to receives the second downlink control information over the third second search space. Within the maximum PUSCH transmission time range, the number of first search spaces that the terminal gives up monitoring is 2.

After the maximum PUSCH transmission time range, the base station sends the first downlink control information over the first search space; and the terminal receives the first downlink control information over the first search space; where the first downlink control information includes downlink control information for scheduling the terminal to transmit the PUSCH. Within the maximum PUSCH transmission time range, if the total number Y of candidate sets in all second search spaces monitored by the terminal is greater than the total number X of candidate sets in all first search spaces within the maximum PUSCH transmission time range, when the terminal receives the first downlink control information over W consecutive first search spaces after the maximum PUSCH transmission time, the terminal detects the first downlink control information only in a range of P candidate sets in each of the W first search spaces. Accordingly, when the base station sends the first downlink control information over W consecutive first search spaces after the maximum PUSCH transmission time, the base station sends the first downlink control information only within a range of P candidate sets in each of the W consecutive first search spaces. In this example, the number Q of candidate sets in the first search space is 15, and the number P of candidate sets in the second search space is 7 (equal to floor(Q/2)); within the maximum PUSCH transmission time range (i.e., 1024 repetitions), the number of second search spaces monitored by the terminal is 3, and the total number Y of candidate sets in all second search spaces is 21 (equal to 3×P); and the number of first search spaces within the maximum PUSCH transmission time range is 2, and the total number X of candidate sets in all first search spaces is 30 (equal to 2×Q); that is, the total number Y (equal to 21) of candidate sets in all second search spaces monitored by the terminal is less than the total number X (equal to 30) of candidate sets in all first search spaces within the maximum PUSCH transmission time range. When the terminal receives the first downlink control information over a first search space after the maximum PUSCH transmission time, the terminal detects the first downlink control information within a range of Q (equal to 15) candidate sets in the first search space; and when the base station sends the first downlink control information over the first search space after the maximum PUSCH transmission time, the base station sends the first downlink control information within the range of Q (equal to 15) candidate sets in the first search space, that is, the terminal does not give up detecting the first downlink control information on some candidate sets in the first search space.

Embodiment 3-4

In this embodiment, when the number K of first search spaces within the maximum PUSCH transmission time range is greater than a threshold N, the terminal receives the first downlink control information over a first search space in the period of PUSCH transmission; and the base station sends the first downlink control information over the first search space; where the first downlink control information includes downlink control information for carrying ACK feedback.

Application Example

Figure 13:
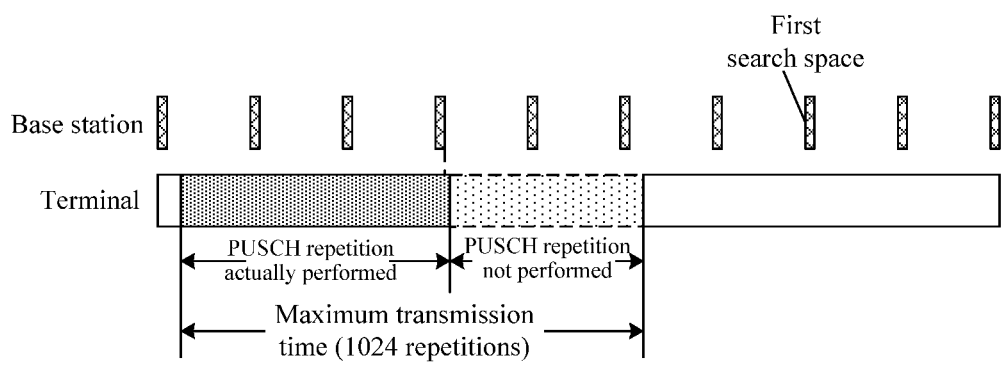
FIG. 13 is a schematic diagram three showing transmission of ACK feedback during a PUSCH transmission in this example.

FIG. 13 is a schematic diagram three of transmission of ACK feedback during a period of PUSCH transmission in this example. Before PUSCH transmission, the base station sends first downlink control information over a first search space; and the terminal receives the first downlink control information over the first search space; where the first downlink control information includes downlink control information for scheduling the terminal to transmit the PUSCH. In this example, the base station schedules the terminal to transmit the PUSCH and indicates that the number of repetitions of PUSCH transmission is 1024. Since the terminal is allowed to terminate PUSCH transmission in advance, the 1024 repetitions may be considered as the maximum number of repetitions of PUSCH transmission or maximum transmission time of PUSCH transmission; where a repetition corresponds to at least one subframe.

In this example, the threshold N is 4; and the number K (equal to 5) of first search spaces within the maximum PUSCH transmission time range (i.e., 1024 repetitions) is greater than the threshold N (equal to 4). In the period of PUSCH transmission, the base station sends the first downlink control information over the first search space; and the terminal receives the first downlink control information over the first search space; where the first downlink control information includes downlink control information carrying ACK feedback. In this example, the terminal receives the first downlink control information over at most five first search spaces until the terminal receives the downlink control information carrying ACK feedback. If the base station successfully decodes the PUSCH data, the base station selects one of the five second search spaces to send the downlink control information carrying ACK feedback. For example, if the base station successfully decodes the PUSCH data before the start time of a first search space in the period of PUSCH transmission, the base station sends the downlink control information carrying ACK feedback over the first search space; and the number of first search spaces monitored by the terminal is 1. If the base station successfully decodes the PUSCH data after the start time of the first search space and before the start time of a second first search space in the period of PUSCH transmission, the base station sends the downlink control information carrying ACK feedback over the second first search space; and the number of first search spaces monitored by the terminal is 2, and the terminal receives the downlink control information carrying ACK feedback over the second first search space. In the similar way, if the base station successfully decodes the PUSCH data after the start time of a fourth first search space and before the start time of a fifth first search space in the period of PUSCH transmission, the base station sends the downlink control information carrying ACK feedback over the fifth first search space; and the number of first search spaces monitored by the terminal is 5, and the terminal receives the downlink control information carrying ACK feedback over the fifth first search space.

In this example, the base station successfully decodes the PUSCH data after the start time of the second first search space and before the start time of a third first search space; and the base station sends the downlink control information carrying ACK feedback over the third first search space. The terminal, after receiving the downlink control information carrying ACK feedback over the third first search space, terminates PUSCH transmission before the end of a fourth subframe after the end of the transmission of the downlink control information.

After the end of PUSCH transmission, the base station sends the first downlink control information over the first search space; and the terminal receives the first downlink control information over the first search space; where the first downlink control information includes downlink control information for scheduling the terminal to transmit the PUSCH.

Embodiment Four

An embodiment of the present application further provides a storage medium. In one embodiment, the storage medium may be configured to store program codes for executing steps S1 and S2.

In step S1, downlink data is received during a PUSCH transmission.

In step S2, when the received downlink data is first feedback, the PUSCH transmission is terminated; and when the received downlink data is second feedback, the PUSCH transmission is terminated and a first operation is executed.

This embodiment is similar to other solution, and what has been described will not be repeated herein.

In one embodiment, the storage medium may include, but is not limited to, a USB flash disk, a ROM, a RAM, a mobile hard disk, a magnetic disk, an optical disk or another medium capable of storing the program codes.

In one embodiment, a processor, according to the stored program codes in the storage medium, executes: receiving downlink data during a PUSCH transmission; when the received downlink data is first feedback, terminating the PUSCH transmission; and when the received downlink data is second feedback, terminating the PUSCH transmission and executing a first operation.

For examples in this embodiment, reference may be made to examples described in the above embodiment and exemplary embodiments, and what has been described will not be repeated herein.

It should be understood by those skilled in the art that each of the above-mentioned modules or steps of the present application may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:
1. A data transmission method, comprising:
receiving second downlink control information over a second search space, and rejecting receiving first downlink control information over a first search space; wherein the second downlink control information comprises downlink control information for carrying feedback of a base station;
wherein receiving the second downlink control information over the second search space and rejecting receiving the first downlink control information over the first search space comprise:
during a physical uplink shared channel (PUSCH) transmission, receiving the second downlink control infor- mation over the second search space and rejecting receiving the first downlink control information over the first search space; and wherein from start of the PUSCH transmission to end of the PUSCH transmission, in a case where a number Y of second search spaces monitored by a terminal is greater than a number X of first search spaces, rejecting receiving the first downlink control information over (Y-X) consecutive first search spaces after the end of the PUSCH transmission; wherein Y and X are both positive integers.

2. The method of claim 1, wherein the feedback comprises acknowledgement (ACK) feedback corresponding to the PUSCH transmission.

3. A non-transitory computer-readable storage medium, comprising stored computer executable instructions, wherein the computer executable instructions, when executed by a processor, perform the data transmission method of claim 1.

4. The non-transitory computer-readable storage medium of claim 3, wherein the feedback comprises acknowledgement (ACK) feedback corresponding to the PUSCH transmission.

5. A data transmission method, comprising:
receiving second downlink control information over a second search space, and rejecting receiving first downlink control information over a first search space; wherein the second downlink control information comprises downlink control information for carrying feedback of a base station;

wherein receiving the second downlink control information over the second search space and rejecting receiving the first downlink control information over the first search space comprise:

within a maximum PUSCH transmission time range, receiving the second downlink control information over the second search space and rejecting receiving the first downlink control information over the first search space;

wherein the maximum PUSCH transmission time range is pre-configured; and wherein in a case where a number Y of second search spaces within the maximum PUSCH transmission time range is greater than a number X of first search spaces, rejecting receiving the first downlink control information over (Y-X) consecutive first search spaces after the maximum PUSCH transmission time range;

wherein Y and X are positive integers.

6. The method of claim 5, wherein in a case where a total number Y of candidate sets in all second search spaces within the maximum PUSCH transmission time range is greater than a total number X of candidate sets in all first search spaces, and the first downlink control information is received over W consecutive first search spaces after the maximum PUSCH transmission time range, detecting the first downlink control information only on P candidate sets in each of the W first search spaces;

wherein a number P of candidate sets in one of the second search spaces is less than a number Q of candidate sets in one of the first search spaces, and Y, X, W and Q are positive integers.

7. A data transmission apparatus, comprising:
a processor; and a memory for storing processor-executable instructions;

wherein the processor is configured to: perform a method of the data transmission method of claim 5.

8. The data transmission apparatus of claim 7 wherein the processor is configured to:

in a case where a total number Y of candidate sets in all second search spaces within the maximum PUSCH transmission time range is greater than a total number X of candidate sets in all first search spaces, and the first downlink control information is received over W consecutive first search spaces after the maximum PUSCH transmission time range, detect the first downlink control information only on P candidate sets in each of the W first search spaces;

wherein a number P of candidate sets in one of the second search spaces is less than a number Q of candidate sets in one of the first search spaces, and Y, X, W and Q are positive integers.

9. A non-transitory computer-readable storage medium, comprising stored computer executable instructions, wherein the computer executable instructions, when executed by a processor, perform the data transmission method of claim 5.

10. The non-transitory computer-readable storage medium of claim 9, wherein in a case where a total number Y of candidate sets in all second search spaces within the maximum PUSCH transmission time range is greater than a total number X of candidate sets in all first search spaces, and the first downlink control information is received over W consecutive first search spaces after the maximum PUSCH transmission time range, the processor performs detecting the first downlink control information only on P candidate sets in each of the W first search spaces;

wherein a number P of candidate sets in one of the second search spaces is less than a number Q of candidate sets in one of the first search spaces, and Y, X, W and Q are positive integers.

11. A data transmission apparatus, comprising:
a processor; and a memory for storing processor-executable instructions;

wherein the processor is configured to:

receive second downlink control information over a second search space, and reject receiving first downlink control information over a first search space; wherein the second downlink control information comprises downlink control information for carrying feedback of a base station;

during a physical uplink shared channel (PUSCH) transmission, receive the second downlink control information over the second search space and reject receiving the first downlink control information over the first search space; and from start of the PUSCH transmission to end of the PUSCH transmission, in a case where a number Y of second search spaces monitored by a terminal is greater than a number X of first search spaces, reject receiving the first downlink control information over (Y-X) consecutive first search spaces after the end of the PUSCH transmission; wherein Y and X are both positive integers.

12. The apparatus of claim 11, wherein the feedback comprises acknowledgement (ACK) feedback corresponding to the PUSCH transmission.

* * * * *